(12) United States Patent
Kitamura

(10) Patent No.: US 6,338,054 B1
(45) Date of Patent: Jan. 8, 2002

(54) CHANNEL INTERFACE RE-CONNECTION CONTROLLING METHOD AND FILE CONTROLLING APPARATUS

(75) Inventor: Yoshio Kitamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/348,074

(22) Filed: Jul. 6, 1999

(30) Foreign Application Priority Data

Dec. 7, 1998 (JP) .......................................... 10-346357

(51) Int. Cl.⁷ .............................................. G06F 17/30
(52) U.S. Cl. .......................................... 707/1; 707/205
(58) Field of Search .............................. 707/1, 2, 8, 9, 707/10, 104, 205; 710/38, 39; 370/225, 350; 455/414

(56) References Cited

U.S. PATENT DOCUMENTS

| | | | | |
|---|---|---|---|---|
| 4,207,609 A | * | 6/1980 | Luiz et al. | 710/38 |
| 5,805,578 A | * | 9/1998 | Stirpe et al. | 370/225 |
| 5,787,278 A | * | 3/1999 | Carreiro et al. | 710/39 |
| 6,061,559 A | * | 5/2000 | Eriksson et al. | 455/414 |
| 6,215,782 B1 | * | 4/2001 | Buskens et al. | 370/350 |

FOREIGN PATENT DOCUMENTS

| | | | | |
|---|---|---|---|---|
| JP | 60-100238 | 6/1985 | ........... | G06F/12/00 |
| JP | 02-170219 | 7/1990 | ............. | G06F/3/06 |
| JP | 03-028934 | 2/1991 | ............. | G06F/9/46 |
| JP | 03-224036 | 10/1991 | ............. | G06F/9/46 |

\* cited by examiner

*Primary Examiner*—Sanjiv Shah
(74) *Attorney, Agent, or Firm*—Staas & Halsey, LLP

(57) ABSTRACT

A method and an apparatus being able to perform a re-connecting process in the order in which re-connecting factors have generated irrespective of a type of each re-connecting factor. The apparatus includes a controlling unit for controlling re-connection of a channel interface between one of a plurality of processing apparatuses and the apparatus due to generation of a re-connecting factor, after the channel interface between the processing apparatus and the apparatus has been temporarily made to be in a disconnected state since the processing apparatus cannot immediately access to one of a plurality of file storing apparatuses when accessing to the file storing apparatus, and a generation order storing unit for storing the order of generation of the re-connecting factors, in which the control unit monitors generation of the re-connecting factors, stores the order of generation in the generation order storing unit, and re-connects the channel interface between the processing apparatus relating to the re-connecting factor and the apparatus in the order of generation stored in the generation order storing unit. This invention is applied when a plurality of processing apparatuses share a plurality of file storing apparatuses via a file controlling apparatus.

7 Claims, 31 Drawing Sheets

FIG. 3

RESERVE MANAGEMENT TABLE

| DEVICE NUMBER | CA 0 | CA 1 | CA 2 | CA 3 |
|---|---|---|---|---|
| 0 | | | | |
| 1 | | | | |
| 2 | | | | |

DEVICE BUSY REPORT MANAGEMENT TABLE (QUEUE)

42

| DEVICE NUMBER | THE FIRST TCB NUMBER TO WHICH BUSY IS REPORTED | .... | THE N-TH TCB NUMBER TO WHICH BUSY IS REPORTED |
|---|---|---|---|
| 0 | | .... | |
| 1 | | .... | |
| 2 | | .... | |

FIG. 5

TCB

| TCB NUMBER | DEVICE NUMBER | CA NUMBER | RE-CONNECTING STATE | COMMAND |
|---|---|---|---|---|
| 1 | | | | |
| 2 | | | | |
| ⋮ | | | | |

RE-CONNECTING MANAGEMENT TABLE (QUEUE)

| RE-CONNECTING ORDER | TCB NUMBER |
|---|---|
| 1 | |
| 2 | |
| ⋮ | |

TCB

| TCB NUMBER | DEVICE NUMBER | CA NUMBER | RE-CONNECTING STATE | COMMAND |
|---|---|---|---|---|
| 1 | 0 | 0 | | RESERVE |
| 2 | | | | |
| ⋮ | | | | |

RESERVE MANAGEMENT TABLE

| DEVICE NUMBER | CA 0 | CA 1 | CA 2 | CA 3 |
|---|---|---|---|---|
| 0 | 1 | | | |
| 1 | | | | |
| 2 | | | | |

TCB

| TCB NUMBER | DEVICE NUMBER | CA NUMBER | RE-CONNECTING STATE | COMMAND |
|---|---|---|---|---|
| 1 | 0 | 2 | BUSY | RESERVE |
| 2 | | | | |
| ⋮ | | | | |

DEVICE BUSY REPORT MANAGEMENT TABLE (QUEUE)

42

| DEVICE NUMBER | THE FIRST TCB NUMBER TO WHICH BUSY IS REPORTED | .... | THE N-TH TCB NUMBER TO WHICH BUSY IS REPORTED |
|---|---|---|---|
| 0 | 1 | .... | |
| 1 | | .... | |
| 2 | | .... | |

FIG. 16

TCB

| TCB NUMBER | DEVICE NUMBER | CA NUMBER | RE-CONNECTING STATE | COMMAND |
|---|---|---|---|---|
| 1 | 0 | 2 | BUSY | RESERVE |
| 2 | 1 | 3 |  | RESERVE |
| ⋮ |  |  |  |  |

RESERVE MANAGEMENT TABLE

| DEVICE NUMBER | CA 0 | CA 1 | CA 2 | CA 3 |
|---|---|---|---|---|
| 0 | 1 |  |  |  |
| 1 |  |  |  | 1 |
| 2 |  |  |  |  |

TCB  43

| TCB NUMBER | DEVICE NUMBER | CA NUMBER | RE-CONNECTING STATE | COMMAND |
|---|---|---|---|---|
| 1 | 0 | 2 | BUSY | RESERVE |
| 2 | 1 | 3 | WAIT FOR STAGING | READ |
| ⋮ | | | | |

FIG. 19

TCB  43

| TCB NUMBER | DEVICE NUMBER | CA NUMBER | RE-CONNECTING STATE | COMMAND |
|---|---|---|---|---|
| 1 | 0 | 2 | BUSY | RESERVE |
| 2 | 1 | 3 | WAIT FOR STAGING | READ |
| 3 | 0 | 0 | | RELEASE |
| ⋮ | | | | |

FIG. 20

RESERVE MANAGEMENT TABLE

| DEVICE NUMBER | CA 0 | CA 1 | CA 2 | CA 3 |
|---|---|---|---|---|
| 0 | | | | |
| 1 | | | | 1 |
| 2 | | | | |

TCB

| TCB NUMBER | DEVICE NUMBER | CA NUMBER | RE-CONNECTING STATE | COMMAND |
|---|---|---|---|---|
| 1 | 0 | 2 | BUSY | RESERVE |
| 2 | 1 | 3 | COMPLETE STAGING | READ |
| ⋮ | | | | |

RE-CONNECTING MANAGEMENT
TABLE (QUEUE)

| RE-CONNECTING ORDER | TCB NUMBER |
|---|---|
| 1 | 1 |
| 2 | 2 |
| ⋮ | |

FIG. 25
RELATED ART

RESERVE MANAGEMENT TABLE

| DEVICE NUMBER | CA 0 | CA 1 | CA 2 | CA 3 |
|---|---|---|---|---|
| 0 | | | | |
| 1 | | | | |
| 2 | | | | |

DEVICE BUSY REPORT MANAGEMENT TABLE

| DEVICE NUMBER | CA 0 | CA 1 | CA 2 | CA 3 |
|---|---|---|---|---|
| 0 | | | | |
| 1 | | | | |
| 2 | | | | |

DEVICE END REPORT
MANAGEMENT TABLE

| DEVICE NUMBER | CA 0 | CA 1 | CA 2 | CA 3 |
|---|---|---|---|---|
| 0 | | | | |
| 1 | | | | |
| 2 | | | | |

TCB

| TCB NUMBER | DEVICE NUMBER | CA NUMBER | RE-CONNECTING FACTOR | COMMAND |
|---|---|---|---|---|
| 1 | | | | |
| 2 | | | | |
| ⋮ | | | | |

STAGING COMPLETION REPORT
MANAGEMENT TABLE (QUEUE)

| RE-CONNECTING ORDER | TCB NUMBER |
|---|---|
| 1 | |
| 2 | |
| ⋮ | |

TCB

| TCB NUMBER | DEVICE NUMBER | CA NUMBER | RE-CONNECTING FACTOR | COMMAND |
|---|---|---|---|---|
| 1 | 0 | 0 | | RESERVE |
| 2 | | | | |
| ⋮ | | | | |

RESERVE MANAGEMENT TABLE

| DEVICE NUMBER | CA 0 | CA 1 | CA 2 | CA 3 |
|---|---|---|---|---|
| 0 | 1 | | | |
| 1 | | | | |
| 2 | | | | |

TCB

| TCB NUMBER | DEVICE NUMBER | CA NUMBER | RE-CONNECTING FACTOR | COMMAND |
|---|---|---|---|---|
| 1 | 0 | 2 |  | RESERVE |
| 2 |  |  |  |  |
| ⋮ |  |  |  |  |

DEVICE BUSY MANAGEMENT TABLE

| DEVICE NUMBER | CA 0 | CA 1 | CA 2 | CA 3 |
|---|---|---|---|---|
| 0 |  |  | 1 |  |
| 1 |  |  |  |  |
| 2 |  |  |  |  |

TCB

| TCB NUMBER | DEVICE NUMBER | CA NUMBER | RE-CONNECTING FACTOR | COMMAND |
|---|---|---|---|---|
| 1 | 1 | 3 | | RESERVE |
| 2 | | | | |
| ⋮ | | | | |

RESERVE MANAGEMENT TABLE

| DEVICE NUMBER | CA 0 | CA 1 | CA 2 | CA 3 |
|---|---|---|---|---|
| 0 | 1 | | | |
| 1 | | | | 1 |
| 2 | | | | |

TCB

| TCB NUMBER | DEVICE NUMBER | CA NUMBER | RE-CONNECTING FACTOR | COMMAND |
|---|---|---|---|---|
| 1 | 1 | 3 | | READ |
| 2 | | | | |
| ⋮ | | | | |

TCB

| TCB NUMBER | DEVICE NUMBER | CA NUMBER | RE-CONNECTING FACTOR | COMMAND |
|---|---|---|---|---|
| 1 | 1 | 3 | | READ |
| 2 | 0 | 0 | | RELEASE |
| ⋮ | | | | |

RESERVE MANAGEMENT TABLE

| DEVICE NUMBER | CA 0 | CA 1 | CA 2 | CA 3 |
|---|---|---|---|---|
| 0 | | | | |
| 1 | | | | 1 |
| 2 | | | | |

DEVICE END REPORT MANAGEMENT TABLE

| DEVICE NUMBER | CA 0 | CA 1 | CA 2 | CA 3 |
|---|---|---|---|---|
| 0 | | | 1 | |
| 1 | | | | |
| 2 | | | | |

TCB

| TCB NUMBER | DEVICE NUMBER | CA NUMBER | RE-CONNECTING FACTOR | COMMAND |
|---|---|---|---|---|
| 1 | 1 | 3 | COMPLETE STAGING | READ |
| 2 | | | | |
| ⋮ | | | | |

STAGING COMPLETION REPORT
MANAGEMENT TABLE (QUEUE)

| RE-CONNECTING ORDER | TCB NUMBER |
|---|---|
| 1 | 1 |
| 2 | |
| ⋮ | |

35

CHANNEL INTERFACE RE-CONNECTION CONTROLLING METHOD AND FILE CONTROLLING APPARATUS

BACKGROUND OF THE INVENTION

1) Field of the Invention

The present invention relates to a technique applied when a plurality of processing apparatuses share a plurality of file storing apparatuses through a file controlling apparatus. In particular, the present invention relates to a method for controlling re-connection of a channel interface between a processing apparatus and a file controlling apparatus due to generation of a re-connecting factor, after the channel interface has been temporarily made to be in a disconnected state since the processing apparatus cannot access to the file storing apparatus when accessing to the file storing apparatus, and a file controlling apparatus for realizing the above method.

2) Description of the Related Art

When a plurality of processing apparatuses share a plurality of file storing apparatuses, there is generally provided, between between the processing apparatuses and the file storing apparatuses, a file controlling apparatus which controls an accessing operation on each file storing apparatus in response to a command from each processing apparatus. The processing apparatus is, for example, a CPU, whereas the file storing is, for example, a device (DASD: Direct Access Storage Device) such as a magnetic disk or the like. Hereinafter, the file controlling apparatus will be referred as an FCU, whereas the file storing apparatus will be referred simply as a device, occasionally.

In a system having the above FCU, a CPU locks out an access from another CPU by a reserve command in order to read data from each device shared by other CPUs or write data in the device, then issues a read command or a write command when an occupancy of the device is established.

The FCU is a shared device. When a certain CPU occupies the device, the FCU thereafter reports device busy to a command from another CPU to disconnect that CPU. When the device is released from the occupied state by a release command from the CPU having issued the reserve command, the FCU re-connects the CPU (channel) to which device busy has been reported (device end interruption due to release: a first re-connecting factor).

When a read command process or a write command process involves an operation (staging operation) of the magnetic disk, the FCU disconnects a CPU having issued a read command or a write command, then re-connects the CPU (channel) when the staging operation of the magnetic disk is completed (device end interruption due to staging completion: a second re-connecting factor). Incidentally, the staging operation is to read data from a device holding the data into a cache memory when the data to be read or to be written does not exist in the cache memory in the FCU.

Now, a structure of a general FCU will be described with reference to FIG. 23. FIG. 23 is a block diagram showing a structure of a general FCU. As shown in FIG. 23, the FCU 1 is provided between CPUs 2-0 and 2-1 and devices 3-0 through 3-2 in order that a plurality (two in FIG. 23) of the CPUs 2-0 and 2-1 share a plurality (three in FIG. 23) of the devices 3-0 through 3-2 to control an access operation on each of the devices 3-0 through 3-2 in response to a command from each of the CPUs 2-0 and 2-1. Incidentally, when either one of the two existing CPUs is specified, a reference character 2-0 or 2-1 is used, or when there is no need to specify, a reference character 2 is used. Similarly, when any one of the three existing devices is specified, a reference character 3-0, 3-1 or 3-2 is used, or when there is no need to specify, a reference character 3 is used.

The FCU 1 comprises CAs (Channel Adapter) 11-0 through 11-3, an RM (Resource Manager) 12, a TS (Table Storage) 13, a CFE (Cache Function Engine) 14, a cache memory 15, DAs (Device Adapter) 16-0 through 16-2, a command bus 17 and a data bus 18. Incidentally, when any one of the four existing CAs is specified, a reference character 11-0, 11-1, . . . or 11-3 is used, or when there is no need to specify, a reference character 11 is used. Similarly, when any one of the three existing DAs is specified, a reference character 16-0, 16-1 or 16-2 is used, or when there is no need to specify, a reference character 16 is used.

Each of the CAs 11-0 through 11-3 is a module in charge of control on an interface with a corresponding CPU 2-0 or 2-1 via a channel interface. Each of the CPUs 2-0 and 2-1 has, for example, two channels (CH) 2a and 2b. In an example shown in FIG. 23, channels 2a and 2b of the CPU 2-0 are connected to the CAs 11-0 and 11-1, respectively. Channels 2a and 2b of the CPU 2-1 are connected to the CAs 11-2 and 11-3, respectively.

The RM 12 is a module in charge of resource management with respect to a basic operation. The TS 13 is a memory used as a table for resource management. The RM 12 and the TS 13 function as a controlling unit for controlling re-connection of a channel interface due to generation of a re-connecting factor, after a channel interface with one of the two CPUs 2-0 and 2-1 is temporarily made to be in a disconnected state since the CPU 2 cannot access to one of the three devices 3-0, 3-1 or 3-2 when the CPU 2 accesses to the device 3, as will be described with reference to FIGS. 24 through 46.

The CFE 14 is a module in charge of management of the cache memory 15. Each of the DAs 16-0 through 16-2 is a module in charge of control on an interface with a corresponding device 3-0, 3-1 or 3-2 such as a magnetic disk or the like.

The command bus 17 is used to exchange commands among the CA 11, the RM 12, the CFE 14 and the DA 16. The data bus 18 is used to exchange data among the CA 11, the CFE 14, the cache memory 15 and the DA 16.

Next, functional structures of the RM 12 and the TS 13 controlling re-connection of a channel interface will be described with reference to FIGS. 24 through 29. FIG. 24 is a block diagram showing a functional structure of a general RAM 12/TS 13. FIGS. 25 through 29 are diagrams illustrating a reserve management table 31, a device busy report management table 32, a device end report management table 33, a task control block (TCB) 34 and a staging completion report management table (queue) 35.

As shown in FIG. 24, the TS 13 holds the reserve management table 31, the device busy report management table 32, the device end report management table 33, the TCB 34 and the staging completion report management table 35. The RM 12 functions as a mechanism (re-connecting mechanism due to device release) executing a re-connecting process using the device busy report management table 32 and the device end report management table 33 of the TS 13 when the above first re-connecting factor generates. The RM 12 also functions as a mechanism (re-connecting mechanism due to staging completion) executing a re-connecting process using the staging completion report management table 35 of the TS 13 when the above second re-connecting factor generates.

The reserve management table 31 is configured as shown in FIG. 25 to manage a device 3 occupied by a CPU 2. Incidentally, in the table 31, "CA0" through "CA3" correspond to the CA 11-0 through the CA 11-3, respectively, and device numbers 0 through 2 correspond to the devices 3-0 through 3-2, respectively. For example, when a reserve command for the device 3-0 is issued from the channel 2a of the CPU 2-0 so that the CPU 2-0 can occupy the device 3-0, the RM 12 sets "1" at the intersection of "CA0" and device number 0 in the table 31 (refer to FIG. 36).

The device busy report management table 32 is configured as shown in FIG. 26 to manage a CPU 2 to which the RM 12 reports device busy through a corresponding CA 11, and a device 3 that the CPU 2 intends to occupy. Incidentally, in the table 32, "CA0" through "CA3" correspond to the CA 11-0 through CA 11-3, respectively, and device numbers 0 through 2 correspond to the devices 3-0 through 3-2, respectively, as well. For example, when a reserve command for the device 3-0 is issued through the channel 2a (CA 11-2) of the CPU 2-1 in a state where the CPU 2-0 occupies the device 3-0 through the channel 2a (CA 11-0) as stated above, the RM 12 makes a device busy reports, controls the CA 11-2 to disconnect the channel 2a of the CPU 2-1, and sets "1" at the intersection of "CA2" and device number 0 in the table 32 (refer to FIG. 38).

The device end report management table 33 is configured as shown in FIG. 27 to manage a CPU 2 to which the RA 12 should report device end through a corresponding CA 11. Incidentally, in the table 33, "CA0" through "CA3" correspond to the CA 11-0 through CA 11-3, respectively, and device numbers 0 through 2 correspond to the devices 3-0 through 3-2, respectively, as well. For example, when the CPU 2-0 issues a release command for the device 3-0 through the channel 2a (CA 11-0) after device busy is reported and the channel 2a of the CPU 2-1 is disconnected as stated above, the RM 12 (re-connecting mechanism 21) deletes an entry in the reserve management table 31, and refers to the device busy report management table 32 to confirm whether or not there is any CPU 2 to which a device busy report with respect to a device 3 released from occupancy has been made. When there is a CPU 2, the RM 12 copies data of the device busy report management table 32 to the device end report management table 33, and deletes the entry in the device busy report management table 32. Whereby, "1" is set at the intersection of "CA2" and device number 0 in the table 33 (refer to FIG. 44). The RM 12 (re-connecting mechanism 21) refers to the device end report management table 33, controls the CA 11-2 so as to re-connect the channel 2a of the CPU 2-1 at a timing to be described with reference to FIG. 34, and makes a device end report.

The TCB 34 is configured as shown in FIG. 28, and made each time the RM 12 executes a task in response to a command and deleted each time the RM 12 completes the task. The TCB 12 includes information or the like relating to a task, and used to control the task. In the TCB 34, there are held contents (type) of a command from a CPU 2, a number of the CA 11 which has received the command, a number of the device 3 that is an object of the command and a re-connecting factor, with a task number attached to each task. As re-connecting factor, there is held an effect that a staging operation is completed (that is, the second re-connecting factor generates) after the FCU 1 shifts to the staging operation when processing a read command/write command. More concretely, when the staging operation is completed, "1", for example, is set as re-connecting factor in the TCB 34 by the RM 12.

The staging completion report management table 35 is configured as shown in FIG. 29 to manage a TCB number of a task that should undergo a re-connecting process due to completion of staging. In the table 35, there are entered TCB numbers of tasks to each of which a re-connecting factor is set due to completion of the staging operation by the RM 12 as stated above in the order in which the tasks should undergo the re-connecting process (refer to FIG. 46). The RM 12 (re-connecting mechanism 22) refers to the staging completion report management table 35, and performs the re-connecting process due to completion of staging at a timing to be described with reference to FIG. 34.

Next, detailed operations of the above RM 12 and the TS 13 will be described with reference to FIGS. 30 through 46.

First, flows of the operations of the RM 12 and the TS 13 will be described with reference to flowcharts shown in FIGS. 30 through 34.

FIG. 30 is a flowchart illustrating an operation of the RM 12 when the RM 12 receives a reserve command. As shown in FIG. 30, the RM 12 makes a TCB 34 about the reserve command when receiving the reserve command (Step A11), refers to the reserve management table 31, and determines whether or not a device 3 that is an object of the reserve command is reserved by another CPU 2 (another path, another channel) (Step A12).

When the device 3 is not reserved by another path (NO route at Step A12), the RM 12 performs a reserving process on the device 3 that is an object of the reserve command (Step A13), and deletes the TCB 34 with respect to the reserve command (Step A15). In the reserving process, the RM 12 sets "1" at the intersection of a device number of the device 3 that is an object of reserve and a CA 11 having received the reserve command.

When the device 3 that is an object of the reserve command is already reserved by another path (YES route at Step A12), the RM 12 makes an entry about the reserve command in the device busy report management table 32, makes a device busy report to the CPU 2 that is a source of the reserve command, then controls the CA 11 so as to disconnect a channel interface with the CPU 2 (Step A14). After that, the RM 12 deletes the TCB 34 with respect to the reserve command (Step A15)

FIG. 31 is a flowchart illustrating an operation of the RM 12 when the RM 12 receives a release command. As shown in FIG. 31, the RM 12 makes a TCB 34 with respect to a release command when receiving the release command from a CPU 2 occupying a device 3 (Step A21), deletes an entry (setting of "1") corresponding thereto in the reserve management table 31. When there is an entry in the device busy report management table 32 that a device busy report with respect to the device 3 whose occupancy is to be released is made, the RM 12 moves the entry information in the device busy report management table 32 to the device end report management table 33 (Step A22). After that, the RM 12 deletes the TCB 34 with respect to the release command (Step A23).

FIG. 32 is a flowchart illustrating an operation of the RM 12 when the RM 12 receives a read command. As shown in FIG. 32, when the RM 12 receives a read command from a CPU 2 occupying a device 3, the RM 12 makes a TCB 34 with respect to the read command (Step A31), and determines through the CFE 14 whether or not data to be read exists in the cache memory 15 (Step A32).

When the data to be read exists in the cache memory 15 (YES route at Step A32), the RM 12 transfers the data through a corresponding CA 11 to the CPU 2 (Step A33), then deletes the TCB 34 with respect to the read command (Step A34).

When the data to be read does not exist in the cache memory 15 (NO route at Step A32), the RM 12 reports channel end to the CPU 2 through the CA 11, requests a corresponding DA 16 to perform staging on the device 3, and shifts to a staging completion report waiting process to be described with reference to FIG. 33 (Step A35). On this occasion, the TCB 34 with respect to the read command is not deleted but kept held.

FIG. 33 is a flowchart illustrating the staging completion report waiting process by the RM 12. As shown in FIG. 33, the RM 12 waits for a staging completion report from a DA 16 to which the RM 12 makes a request for staging (Step A41) When the RM 12 receives the staging completion report from the DA 16 (YES route at Step A41), the RM 12 sets "staging completion", that is, "1" to the re-connecting factor of a TCB 34 with respect to a corresponding read command (Step A42).

The RM 12 enters a TBC number of the task to which the re-connecting factor has been set at Step A42 in the staging completion report management table 35 (Step A43), and waits for the data read out in the staging operation to be transferred to a CPU 2 by a corresponding CA 11 according to an idle loop to be described with reference to FIG. 34 (Step A44). When the CA 11 completes transfer of the data (YES route at Step A44), the RM 12 deletes the TCB 34 with respect to the read command waiting for the staging completion report (Step A45).

FIG. 34 is a flowchart illustrating a process using the idle loop by the RM 12. As shown in FIG. 34, the RM 12 determines at any time using the idle loop whether or not a TCB number is entered in the staging complete report management table 35. In other words, the RM 12 determines whether or not the second re-connecting factor generates (Step A51). The RM 12 then determines whether or not there is any entry information in the device end report management table 33, that is, whether or not the first re-connecting factor generates (Step A53).

Generally, re-connecting due to staging completion is performed in preference to re-connecting due to device release. For this, when a TCB number is entered in the staging completion report management table 35 (YES route at Step A51), the RM 12 refers to a TCB 34 at that TCB number, re-connects a CPU 2 corresponding thereto, requests the CA 11 to make a staging completion report to the CPU 2, and deletes the TCB number in the staging completion report management table 35 (Step A52).

When a plurality of TCB numbers are entered in the staging completion report management table 35, the above re-connecting process is performed on all the TCB numbers. When all the TCB numbers entered in the staging completion report management table 35 are consumed (NO route at Step A51), the RM 12 determines presence/absence of entry information in the device end report management table 33. When there is any entry information (YES route at Step A53), the RM 12 refers to the entry information, re-connects a CPU 2 corresponding thereto, requests the CA 11 to make a device end report to the CPU 2, and deletes the entry information in the device end report management table 33 (Step A54).

Next, concrete contents of entries in the tables 31 through 33 and 35, and the TCB 34 will be described with reference to FIGS. 35 through 46.

For example, when a reserve command for the device 3-0 is issued from the channel 2a of the CPU 2-0 in a state where none is entered in the tables 31 through 33 and 35, and the TCB 34, "0" is entered as device number, "0" as CA number and "reserve" as command at TCB number 1 in the TCB 34, as shown in FIG. 35. Since any device 3 is not yet reserved on this occasion, a reserving process is performed on the device 3-0, so that "1" is set at the intersection of device number 0 and "CA0" in the reserve management table 31, as shown in FIG. 36. After that, the TCB 34 at TCB number 1 made as shown in FIG. 35 is deleted.

When a reserve command for the device 3-0 is issued through the channel 2a (CA 11-2) of the CPU 2-1 in a state where the CPU 2-0 occupies the device 3-0 through the channel 2a (CA 11-0) as above, "0" is entered as device number, "2" as CA number and "reserve" as command at TCB number 1 in the TCB 34, as shown in FIG. 37. Then, since the device 3-0 is already occupied by the CPU 2-0, device busy is reported to the CPU 2-1 so as to disconnect a channel interface with the CPU 2-1, and "1" is set in the intersection of "CA2" and device number 0 in the device busy report management table 32, as shown in FIG. 38. After that, the TCB 34 at TCB number 1 made as shown in FIG. 37 is deleted.

Following that, when the CPU 2-1 reads data in the device 3-1, a reserve command for the device 3-1 is issued from the channel 2a of the CPU 2-1, and "1" is entered as device number, "3" as CA number and "reserve" as command at a TCB number 1 in the TCB 34, as shown in FIG. 39. Since the device 3-1 is not reserved at this time, the reserving process on the device 3-1 is performed, so that "1" is set at the intersection of device number 1 and "CA3" in the reserve management table 31, as shown in FIG. 40. After that, the TCB 34 at the TCB number 1 made as shown in FIG. 39 is deleted.

When the CPU 2-1 having reserved the device 3-1 issues a read command, "1" is entered as device number, "3" as CA number and "read" as command at TCB number 1 in the TCB 34 as shown in FIG. 41. When data to be read does not exist in the cache memory 15 on this occasion, the staging operation on the device 3-1 is initiated. During which, the TCB 34 with respect to the read command is not deleted but kept held.

When the CPU 2-0 having reserved the device 3-0 issues a release command through the CA 11-0 in the above state, "0" is entered as device number, "0" as CA number and "release" as command at TCB number 2 in the TCB 34, as shown in FIG. 42. Then, "1" having been set at the intersection of device number 0 and "CA0" is deleted in the reserve management table 31 as shown in FIG. 43, entry information in the device busy report management table 32 is moved to the device end report management table 33 as shown in FIG. 44, after that, the TCB 34 at TCB number 2 made as shown in FIG. 42 is deleted.

When the staging operation is completed, "staging completion" (practically, "1") is set to re-connecting factor at TCB number 1 in the TCB 34, as shown in FIG. 45, and TCB number 1 is entered in the staging completion report management table 35, as shown in FIG. 46.

The RM 12 monitors the staging completion report management table 35 and the device end report management table 33 using the idle loop described above with reference to FIG. 34. When recognizing that TCB number 1 is registered in the staging completion report management table 35 as shown in FIG. 46, the RM 12 refers to the TCB 34 at TCB number 1, requests the CA 11-3 to make a staging completion report, after that, deletes TCB number 1 in the staging completion report management table 35 and deletes the TCB 34 at TCB number 1.

When no entry information exists in the staging completion report management table 35, the RM 12 refers to the device end report management table 33. When information as shown in FIG. 46 is entered, for example, the RM 12 requests the CA 11-2 to make a device end report with respect to the device 3-0, after that, deletes the entry information in the device end report management table 33.

When the FCU 1 shifts to the staging operation in response to a read command, the FCU 1 generally reports channel end to a CPU 2 having issued the read command and temporarily disconnects the CPU 2, so that the CPU 2 gets into a state where the CPU 2 waits for a staging completion report. The state where the CPU 2 waits for a staging completion report is a state for the CPU 2 where the CPU 2 waits for one I/O processing to be completed. The staging operation is completed within a relatively short period, so that time monitoring is performed in a predetermined time corresponding thereto (about 30 second, for example). When the predetermined time is elapsed, a resetting process is performed.

On the other hand, in the case where a device 3 accessed by a certain CPU 2 is occupied by another CPU 2 so that the FCU 1 makes a device busy report to temporarily disconnect the CPU 2 and the CPU 2 therefore gets into a state where the CPU 2 waits for a device end report, a time period for which the device is occupied is relatively long, thus time monitoring is performed for a predetermined time (3 minutes, for example) corresponding thereto and the resetting process is performed when the predetermined time is elapsed.

As stated above, the staging operation is completed within a much shorter time than a time for which the device is occupied, and the FCU 1 and a CPU 2 in a state where the CPU 2 waits for a staging completion report are disconnected in a channel end state but have to be certainly re-connected thereafter. For this, the staging completion report and the device end report are separately managed, in general. Re-connecting due to staging completion (staging completion report) is performed in preference to re-connecting due to device release (device end report).

In these years, the number of devices 3 to be managed by the FCU 1 is considerably increased (256, for example). In such case, reading processes on a number of devices 3 are concurrently performed so that a number of staging operations are concurrently performed, which often leads to an increase of the number of staging completion reports, and a queue of a plurality of TCB numbers in the staging completion report management table 35. Under such circumstances, a staging completion report is made in preference to a device end report until TCB numbers entered in the staging completion report management table 35 are consumed, which brings a situation where a device end report cannot be hardly made.

To cope with this, it is possible to make a device end report in preference to a staging completion report once in several occasions. However, since the FCU 1 does not recognize the order in which the FCU 1 should re-connect due to device release (the order in which device end reports should be made), only a device end report with respect to a certain device 3 is prone to be delayed when reserve/release frequently occurs on that device 3, leading to a partiality for the devices 3 about which device end reports can be made to the CPUs 2.

SUMMARY OF THE INVENTION

In the light of the above problem, an object of the present invention is to provide a channel interface re-connection controlling method and a file controlling apparatus, in which a re-connecting process can be performed in the order in which re-connecting factors have generated irrespective of a type of each re-connecting factor so that both a device end report due to release and a staging completion report are executed without delay and postponement.

The present invention therefore provides a method used in a system having a file controlling apparatus provided between a plurality of processing apparatuses and a plurality of file storing apparatuses to control an accessing operation on each of the file storing apparatuses in response to a command from each of the processing apparatuses in order that the plurality of processing apparatuses share the plurality of file storing apparatuses, the method for controlling re-connection of a channel interface between one of the plurality of processing apparatuses and the file controlling apparatus due to generation of a re-connecting factor, after the channel interface therebetween has been temporarily made to be in a disconnected state since the processing apparatus cannot immediately access to one of the plurality of file storing apparatuses when the processing apparatus accesses to the file storing apparatus, the channel interface re-connection controlling method comprising the steps of monitoring generation of the re-connecting factors, storing the order of generation of the re-connecting factors, and re-connecting the channel interface between the processing apparatus relating to each of the re-connecting factors and the file controlling apparatus relating to each of the re-connecting factors in the stored order of generation of the re-connecting factors.

The above re-connecting factors includes a first re-connecting factor generating when the file storing apparatus is released from another processing apparatus, after the file controlling apparatus makes a busy report to the former processing apparatus and a channel interface between the former processing apparatus and the file controlling apparatus has been temporarily made to be in a disconnected state since the file storing apparatus is occupied by the latter processing apparatus when the former processing apparatus accesses to the file storing apparatus, and a second re-connecting factor generating when the file controlling apparatus completes a staging operation, after a channel interface between the processing apparatus and the file controlling apparatus has been temporarily made to be in a disconnected state since the file controlling apparatus shifts to the staging operation on a file storing apparatus in response to a command from a certain processing apparatus.

The present invention further provides a file controlling apparatus provided between a plurality of processing apparatuses and a plurality of file storing apparatuses in order that the plurality of processing apparatuses share the plurality of file storing apparatuses to control an accessing operation on each of the file storing apparatuses in response to a command from each of the processing apparatuses, the file controlling apparatus comprising a controlling unit for controlling re-connection of a channel interface between one of the plurality of processing apparatuses and the file controlling apparatus due to generation of a re-connecting factor, after the channel interface between the processing apparatus and the file controlling apparatus has been temporarily made to be in a disconnected state since the processing apparatus cannot immediately access to one of the plurality of file storing apparatuses when the processing apparatus accesses to the file storing apparatus, and a generation order storing unit for storing the order of generation of the re-connecting factors, wherein the controlling unit monitors generation of the re-connecting factors, stores the order of generation of the re-connecting factors in the generation order storing unit, and re-connects the channel interface between the processing apparatus relating to each of the re-connecting factors and the file controlling apparatus relating to each of the reconnecting factors in the order of generation stored in the generation order storing unit.

The above re-connecting factors includes a first re-connecting factor generating when the file storing apparatus is released from another processing apparatus, after the file controlling apparatus makes a busy report to the former processing apparatus and a channel interface between the former processing apparatus and the file controlling apparatus has been temporarily made to be in a disconnected state since the file storing apparatus accessed by the former processing apparatus is occupied by the latter processing apparatus, and a second re-connecting factor generating when the file controlling apparatus completes a staging operation, after a channel interface between the processing apparatus and the file controlling apparatus has been temporarily made to be in a disconnected state since the file controlling apparatus shifts to the staging operation on a file storing apparatus in response to a command from a certain processing apparatus.

The controlling unit may determine that the first re-connecting factor generates when a release command has been received from the latter processing apparatus, and enters the first re-connecting factor in the generation order storing unit. In which case, the controlling unit may manage the busy report using a task control block, and enter a number of the task control block in the generation order storing unit when the first re-connecting factor generates. The above file controlling apparatus may further comprise a busy report order storing unit for storing the order in which the busy reports have been made.

Still further, the controlling unit may determine that the second re-connecting factor generates when a completion report about the staging operation has been received, and enters the second re-connecting factor in the generation order storing unit. In which case, the controlling unit may manage a state of waiting for the completion report about the staging operation using a task control block, and enter a number of the task control block in the generation order storing unit when the second re-connecting factor generates.

According to the channel interface re-connection controlling method and the file controlling apparatus of this invention, it is possible to perform a re-connecting process in the order in which re-connecting factors have generated irrespective of a type of each re-connecting factor. It is therefore possible to execute a device end report due to release and a staging completion report without delay and postponement. Consequently, device end reports can be made in the order in which devices have been released, thereby certainly avoiding postponement of a device end report heretofore occurring due to an increase of the number of staging completion reports.

BRIEF DESCRIPTION OF THE DRAWINGS

FIG. 3 is a diagram illustrating a reserve management table according to the embodiment;

FIG. 4 is a diagram illustrating a device busy report management table (queue: busy report order storing unit) according to the embodiment;

FIG. 5 is a diagram illustrating a task control block (TCB) according to the embodiment;

FIG. 6 is a diagram illustrating a re-connecting management table (queue: generation order storing unit) according to the embodiment;

FIG. 12 is a diagram illustrating concrete contents entered in the TCB according to the embodiment;

FIG. 13 is a diagram illustrating concrete contents entered in the reserve management table according to the embodiment;

FIG. 14 is a diagram illustrating concrete contents entered in the TCB according to the embodiment;

FIG. 15 is a diagram illustrating concrete contents entered in the device busy report management table (queue) according to the embodiment;

FIG. 16 is a diagram illustrating concrete contents entered in the TCB according to the embodiment;

FIG. 17 is a diagram illustrating concrete contents entered in the reserve management table according to the embodiment;

FIGS. 18 and 19 are diagrams illustrating concrete contents entered in the TCB according to the embodiment;

FIG. 20 is a diagram illustrating concrete contents entered in the reserve management table according to the embodiment;

FIG. 21 is a diagram illustrating concrete contents entered in the TCB according to the embodiment;

FIG. 22 is a diagram illustrating concrete contents entered in the re-connecting management table (queue) according to the embodiment;

FIG. 25 is a diagram illustrating a reserve management table;

FIG. 26 is a diagram illustrating a device busy report management table;

FIG. 27 is a diagram illustrating a device end report management table;

FIG. 28 is a diagram illustrating a task control block (TCB);

FIG. 29 is a diagram illustrating a staging completion report management table (queue);

FIG. 35 is a diagram illustrating concrete contents entered in the TCB;

FIG. 36 is a diagram illustrating concrete contents entered in the reserve management table;

FIG. 37 is a diagram illustrating concrete contents entered in the TCB;

FIG. 38 is a diagram illustrating concrete contents entered in the device busy report management table;

FIG. 39 is a diagram illustrating concrete contents entered in the TCB;

FIG. 40 is a diagram illustrating concrete contents entered in the reserve management table;

FIG. 41 is a diagram illustrating concrete contents entered in the TCB;

FIG. 42 is a diagram illustrating concrete contents entered in the TCB;

FIG. 43 is a diagram illustrating concrete contents entered in the reserve management table;

FIG. 44 is a diagram illustrating concrete contents entered in the device end report management table;

FIG. 45 is a diagram illustrating concrete contents entered in the TCB; and

FIG. 46 is a diagram illustrating concrete contents entered in the staging completion report management table (queue).

DESCRIPTION OF THE PREFERRED EMBODIMENTS

Hereinafter, description will be made of an embodiment of this invention with reference to the drawings.

Figure 2:
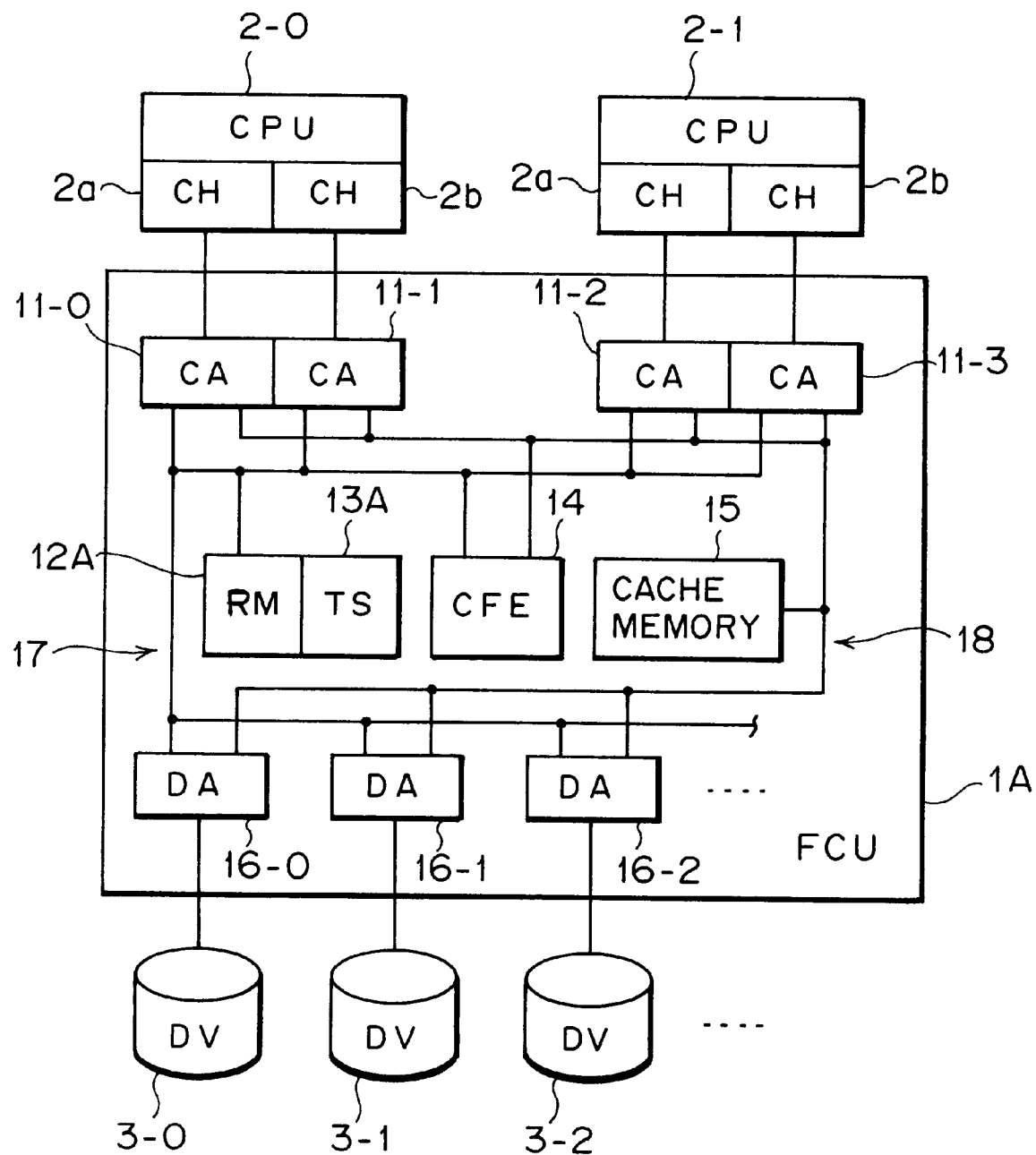
FIG. 2 is a block diagram showing a structure of the file controlling apparatus according to the embodiment.
Figure 23:
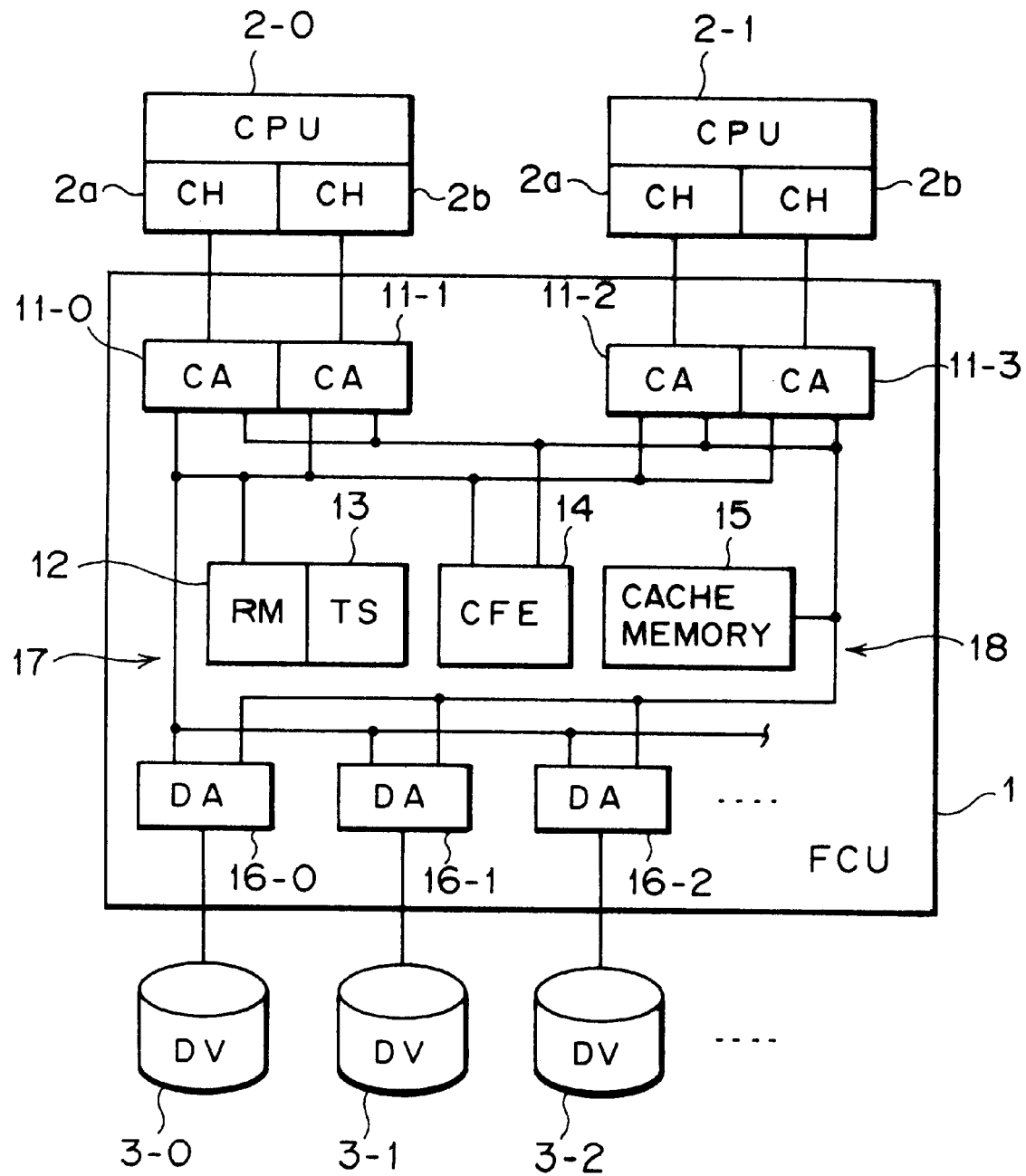
FIG. 23 is a block diagram showing a structure of an FCU.
Figure 24:
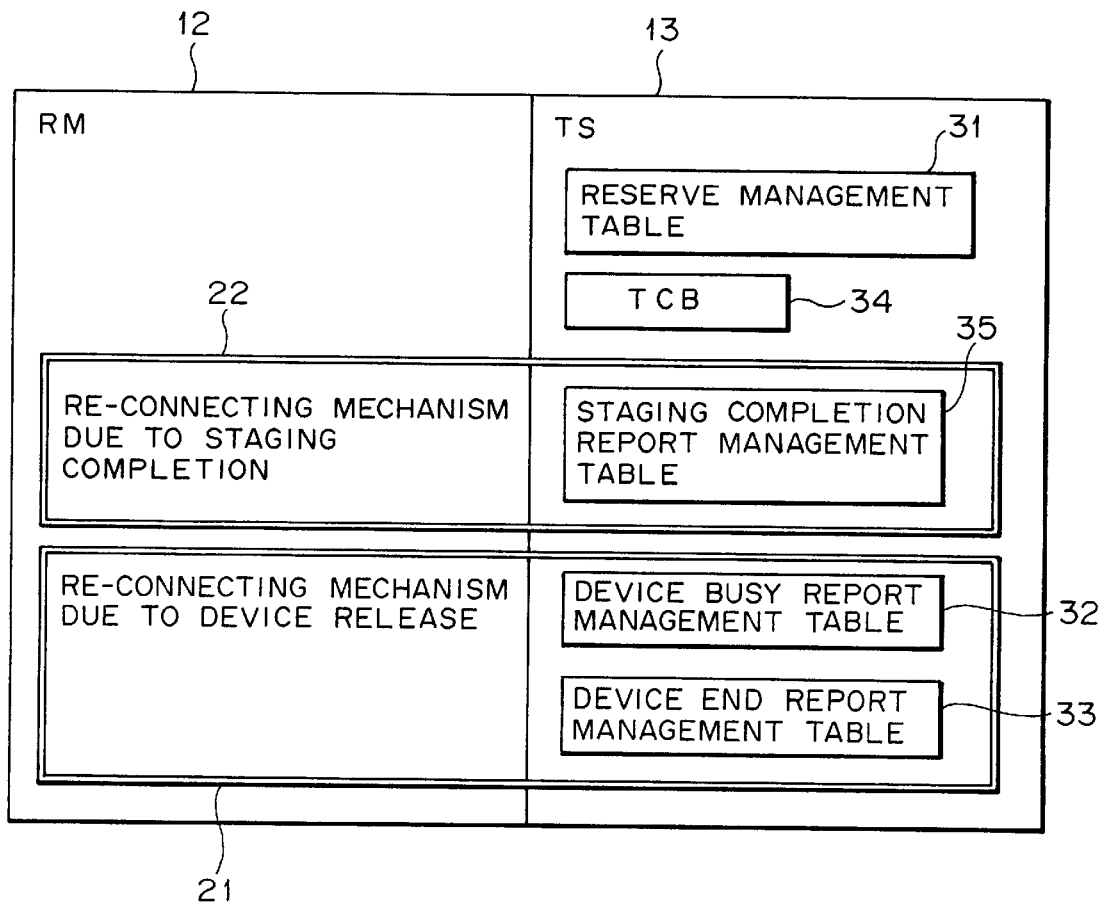
FIG. 24 is a block diagram showing a functional structure of an RM/TS.
Figure 30:
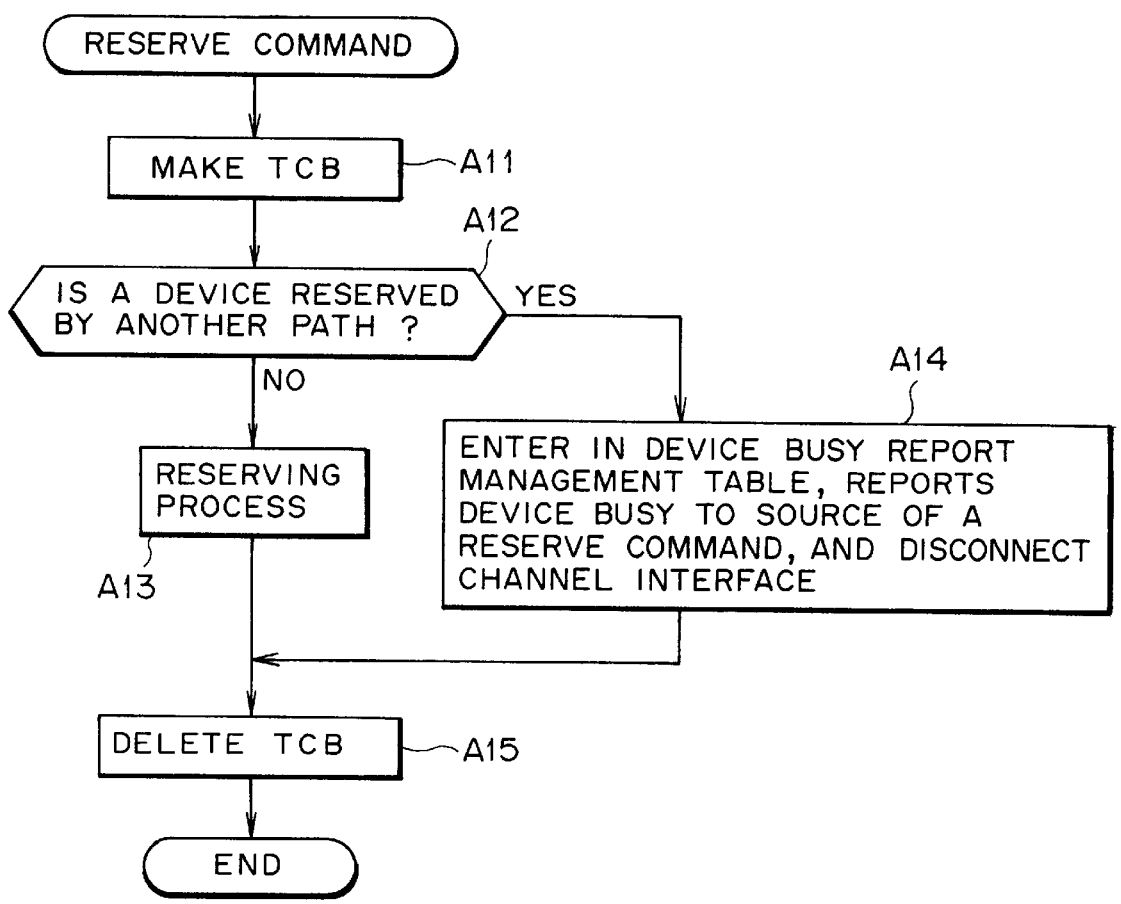
FIG. 30 is a flowchart illustrating an operation of the RM when the RM has received a reserve command.
Figure 31:
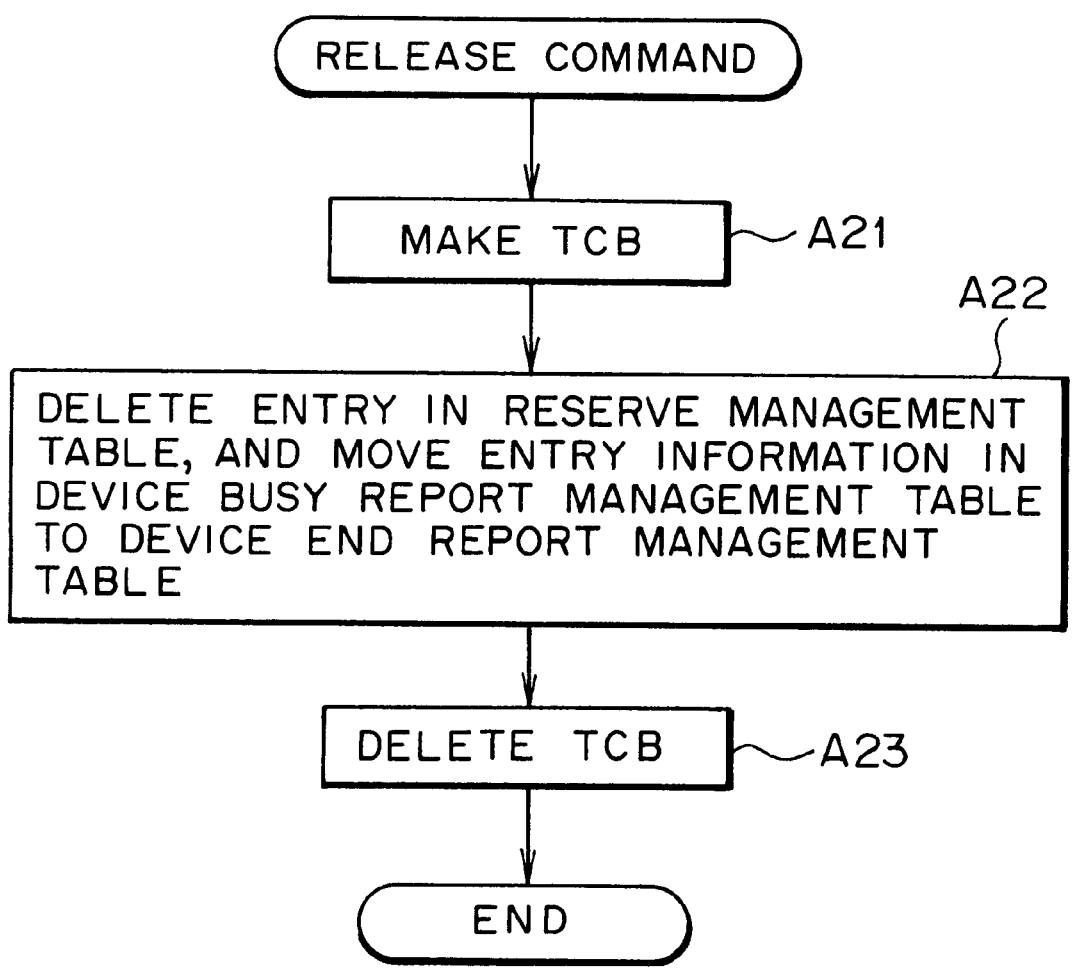
FIG. 31 is a flowchart illustrating an operation of the RM when the RM has received a release command.
Figure 32:
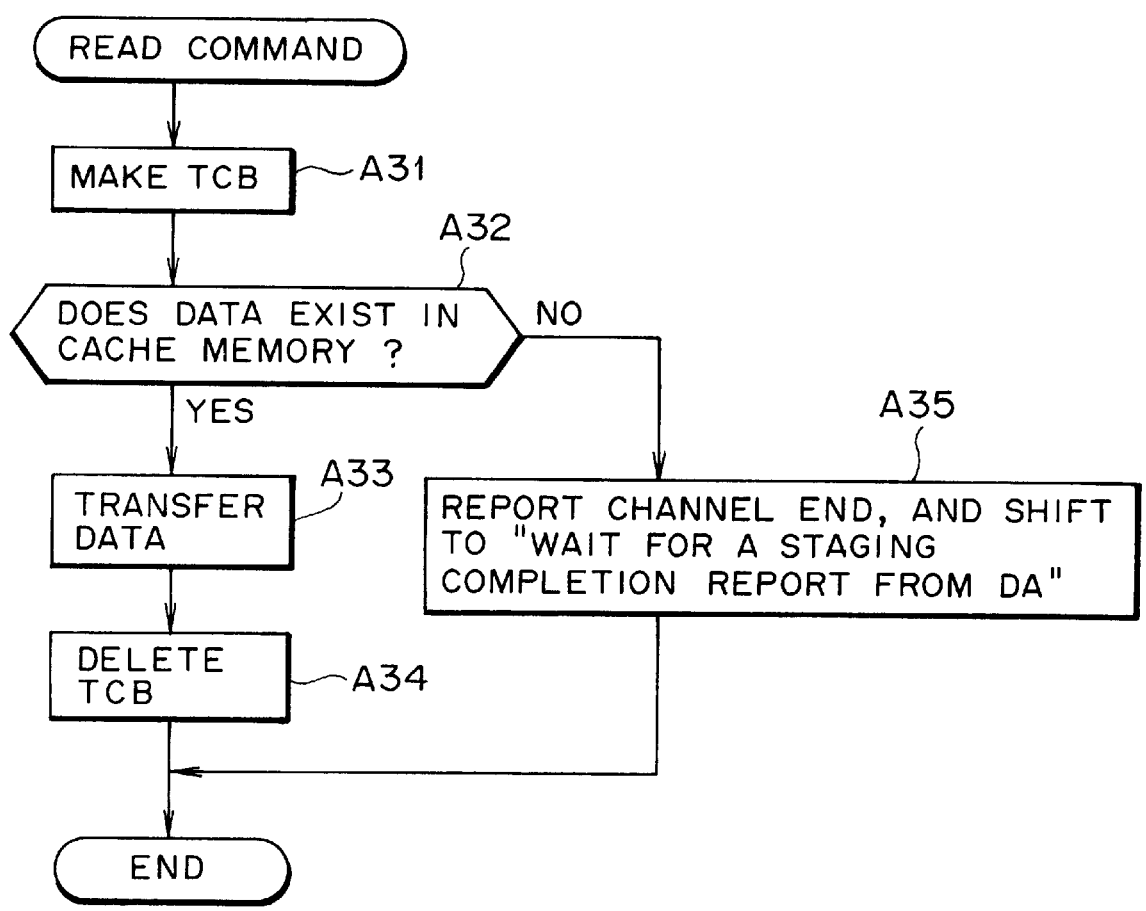
FIG. 32 is a flowchart illustrating an operation of the RM when the RM has received a read command.
Figure 33:
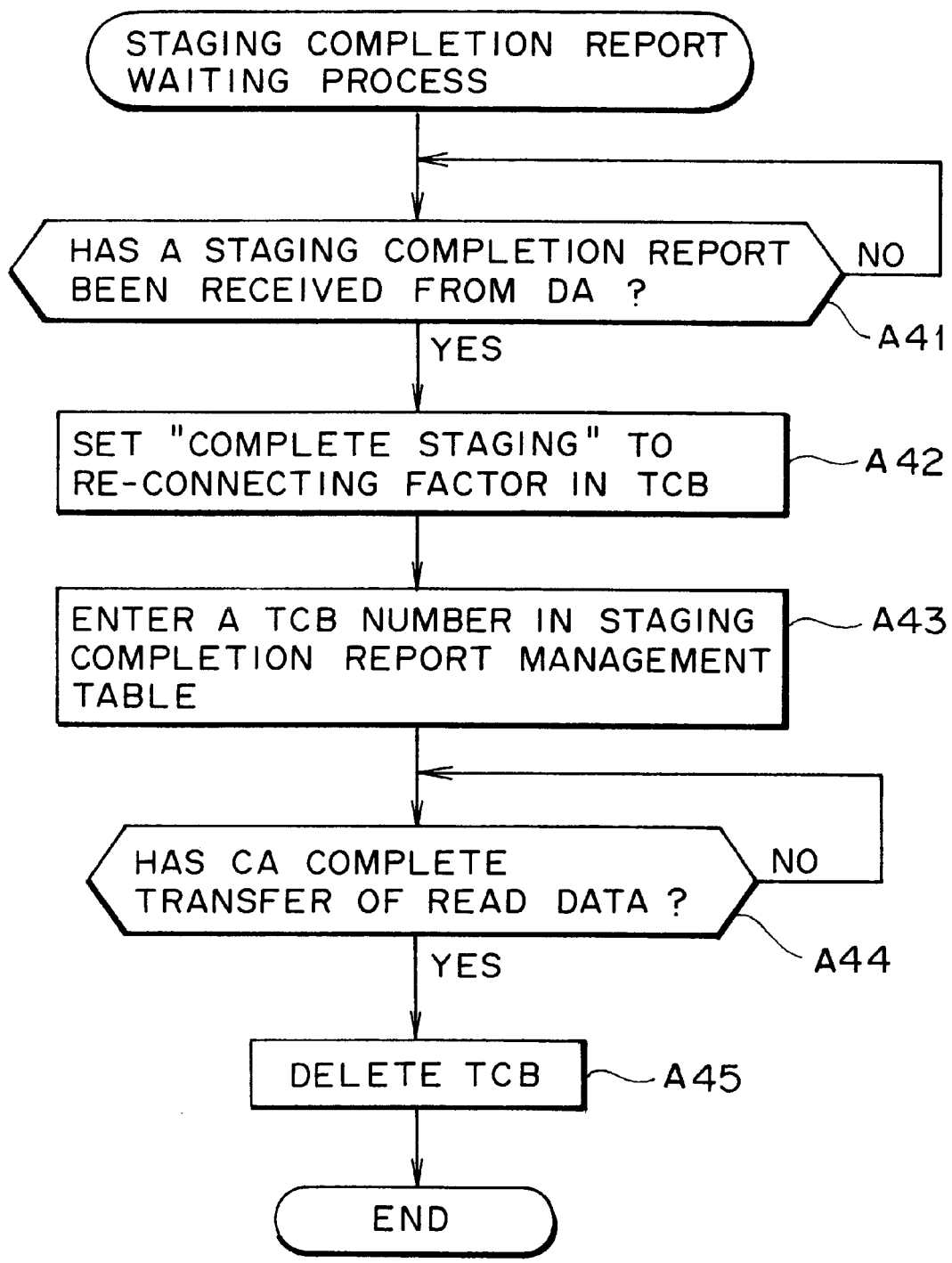
FIG. 33 is a flowchart illustrating a staging completion report waiting process by the RM.
Figure 34:
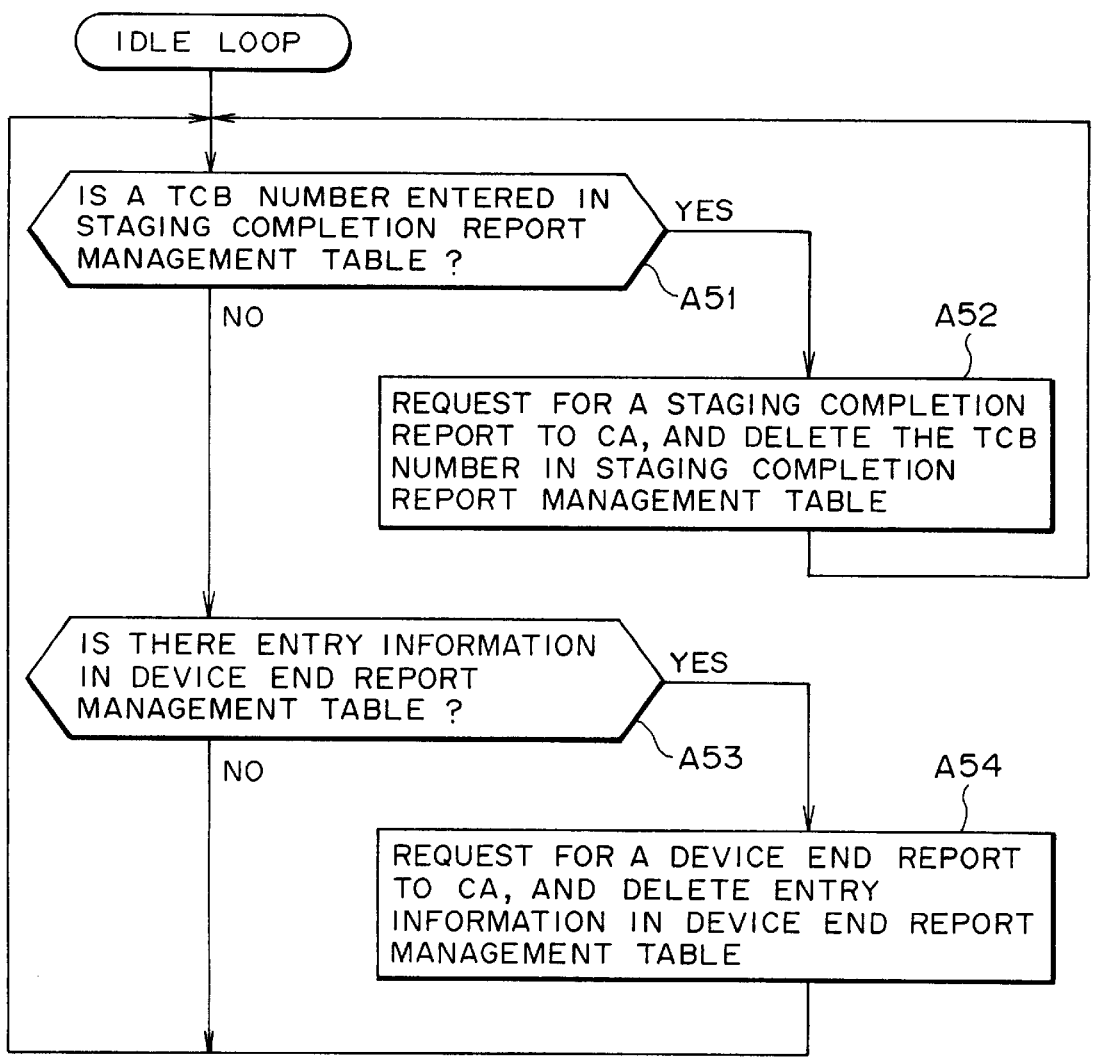
FIG. 34 is a flowchart illustrating a processing by the RM using an idle loop.

FIG. 2 is a block diagram showing a structure of a file controlling apparatus (FCU) according to this embodiment. In order that a plurality (two in FIG. 2) of CPUs 2-0 and 2-1 share a plurality (three in FIG. 2) of devices 3-0 through 3-2, the FCU 1A according to this embodiment is provided between the CPUs 2-0 and 2-1, and the devices 3-0 through 3-2 similarly to the FCU 1 shown in FIG. 23 to control an access operation on each of the devices 3-0 through 3-2 in response to a command from each of the CPUs 2-0 and 2-1, as shown in FIG. 2. Incidentally, when either one of the two existing CPUs is specified, a reference character 2-0 or 2-1 is used, or when there is no need to specify, a reference character 2 is used. Similarly, when any one of the three existing devices is specified, a reference character 3-0, 3-1 or 3-2 is used, or when there is no need to specify, a reference character 3 is used.

The FCU 1A comprises CAs (Channel Adapter) 11-0 through 11-3, an RM (Resource Manager) 12A, a TS (Table Storage) 13B, a CFE (Cache Function Engine) 14, a cache memory 15, DAs (Device Adapter) 16-0 through 16-2, a command bus 17 and a data bus. Incidentally, when any one of the four existing CAs is specified, a reference character 11-0, 11-1, . . . or 11-3 is used, or when there is no need to specify, a reference character 11 is used. Similarly, when any one of the three existing DAs is specified, a reference character 16-0, 16-1 or 16-2 is used, or when there is no need to specify, a reference character 16 is used.

Each of the CAs 11-0 through 11-3 is a module in charge of control on an interface with the CPU 2-0 or 2-1 via a channel interface. Each of the CPUs 1-0 and 2-1 has, for example, two channels (CH) 2a and 2b. In the example shown in FIG. 2, the channels 2a and 2b of the CPU 2-0 are connected to the CAs 11-0 and 11-1, respectively. The channels 2a and 2b of the CPU 2-1 are connected to the CAs 11-2 and 11-3, respectively.

The RM 12A is a module in charge of resource management relating to a basic operation. The TS 13A is a memory used as a table for resource management. The RM 12A and the TS 13A function as a controlling unit for controlling re-connection of a channel interface due to generation of a re-connecting factor, after a channel interface with the CPU 2 has been temporarily made to be in a disconnected state since one of the CPUs 2-0 and 2-1 cannot immediately access to one of the devices 3-0 through 3-2 when accessing to the device 3.

The CFE 14 is a module in charge of management of the cache memory 15. Each of the DAs 16-0 through 16-2 is a module in charge of control on an interface with a corresponding device 3-0, 3-1 or 3-2 such as a magnetic disk or the like.

The command bus 17 is to exchange commands among the CA 11, the RM 12A, the CFE 14 and the DA 16. The data bus 18 is to exchange data among the CA 11, the CFE 14, the cache memory 15 and the DA 16.

The FCU 1A is a shared device of the CPUs 2. When a certain CPU 2 occupies a device 3, the FCU 1A thereafter reports device busy in response to a command from another CPU 2, and disconnects that CPU 2. When the device 3 is released from an occupied state in response to a release command from the CPU 2 having issued a reserve command, the FCU 1A re-connects the CPU 2 to which device busy has been reported (device end interruption due to release: a first re-connecting factor).

In the case where a write command process or a read command process involves an operation (staging operation) on the device 3, the FCU 1A once disconnects a CPU 2 having issued a read command or a write command, and re-connects the CPU 2 when the staging operation on the device 3 is completed (device end interruption due to staging completion: a second re-connecting factor).

Figure 1:
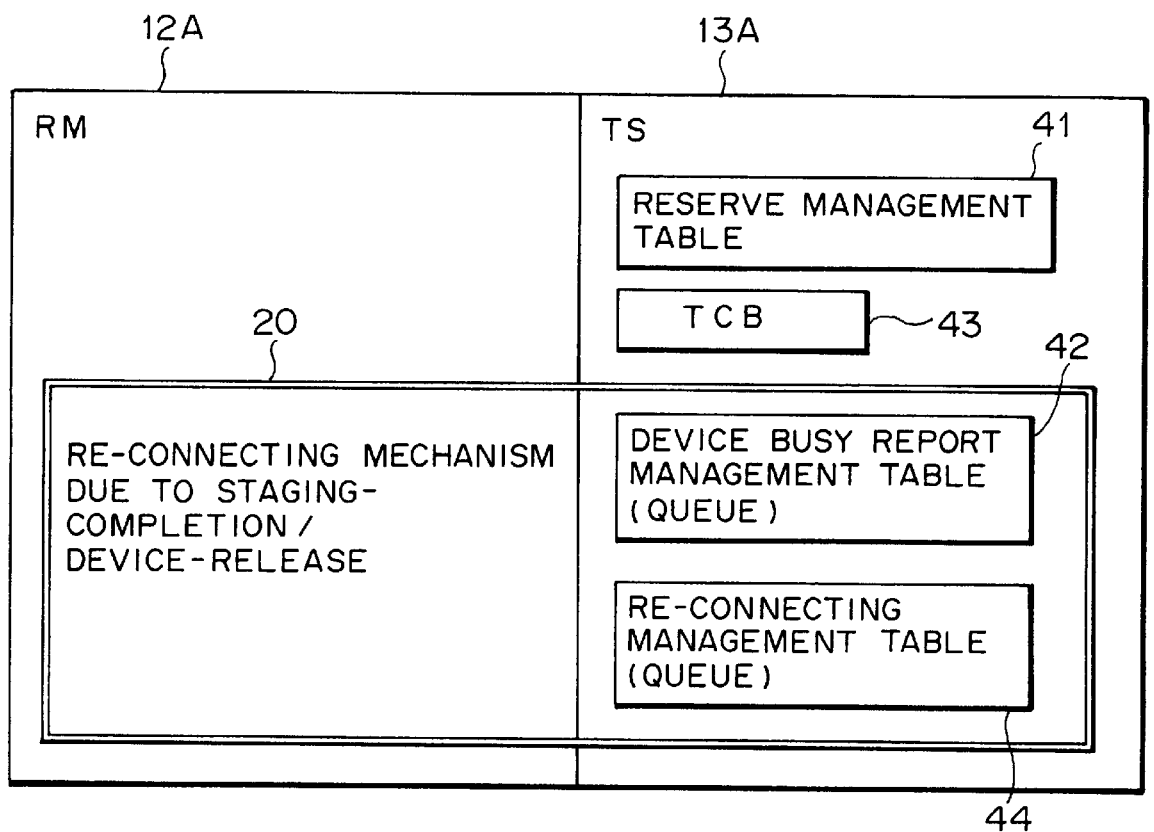
FIG. 1 is a block diagram showing a functional structure of an RM/TS in a file controlling apparatus (FCU) according to an embodiment of this invention.

Next, description will be made of functional structures of the RM 12 and the TS 13A controlling re-connection of a channel interface in the FCU 1A according to this embodiment with reference to FIGS. 1 and 3 through 6. FIG. 1 is a block diagram showing a functional structure of the RM 12A/TS 13A in the FCU 1A according to the embodiment of this invention. FIGS. 3 through 6 are diagrams illustrating a reserve management table 41, a device busy report management table 42, a TBC 43 and a re-connecting management table 44.

As shown in FIG. 1, the TS 13A according to this embodiment holds the reserve management table 41, the device busy report management table 42, the TBC 43 and the re-connecting management table 44. The RM 12A according to this embodiment functions as a mechanism (re-connecting mechanism due to staging completion/device release) executing a re-connecting process when the above-mentioned first re-connecting factor or the second re-connecting factor generates, using the device busy report management table 42 and the re-connecting management table 44 of the TS 13A.

The reserve management table 41 is configured as shown in FIG. 3 to manage a device 3 occupied by a CPU 2, similarly to the table 31 shown in FIG. 25. Incidentally, in the table 41, "CA0" through "CA3" correspond to the CA 11-0 through 11-3, respectively, and device numbers 0 through 2 correspond to the devices 3-0 through 3-2, respectively. For example, when a reserve command for the device 3-0 is issued from the channel 2a of the CPU 2-0 so that the CPU 2-0 can occupy the device 3-0, the RM 12A sets "1" at the intersection of "CA0" and device number 0 in the table 41 (refer to FIG. 13).

The TCB 43 is configured as shown in FIG. 5. Almost similarly to the TCB 34 shown in FIG. 28, the TBC 43 is made each time the RM 12A performs a task in response to a command, and deleted when the RM 12A finishes the task, the TCB 43 including information and the like relating to the task to control the task. In the TBC 43, there are held contents (type) of a command from a CPU 2, a number of a CA 11 having received the command, a number of a device 3 that is an object of the command and a re-connecting state, with a task number attached to each task.

When the RM 12A reports device busy to the CPU 2 having issued the command (in the case of re-connecting due to the first re-connecting factor), "busy" information is set in a column of re-connecting state in the TCB 43 according to this embodiment (refer to FIG. 14). When the RM 12A shifts to the staging operation at the time of a read command/write command process (in the case of re-connecting due to the second re-connecting factor), "wait for staging" information is set (refer to FIGS. 18 and 19). When the RM 12A completes the staging operation after shifting to the staging operation (when the second re-connecting factor generates), "complete staging" information is set (refer to FIG. 21).

According to this embodiment, when the RM 12A makes a device busy report to a CPU 2 having issued the command, this effect is held as re-connecting state in the TCB 43, as stated above. Heretofore, when a device busy report is made, a TCB 43 about a command relating to the device busy report is deleted after the device busy report is made. According to this embodiment, the TCB 43 is held until a device end report is made due to device release.

Namely, the RM 12a according to this embodiment manages a state where a device busy report has been made and a state where completion of a staging operation is waited, by means of the TCB 43.

The device busy report management table (queue) 42 is configured as shown in FIG. 4 to function as a busy report order storing unit for storing the order in which the RM 12A has made device busy reports. Incidentally, in the table 42, device numbers 0 through 2 correspond to the devices 3-0 through 3-2, respectively. For example, when the CPU 2-1 issues a reserve command for the device 3-0 through the channel 2a (CA 11-2) in a state where the CPU 2-0 occupies the device 3-0 through the channel 2a (CA 11-0) as described above, the RM 12A makes a device busy report, controls the CA 11-2 so as to disconnect the channel 2a of the CPU 2-1, and enters a TCB number of the TBC 43, at which the reserve command is entered, in a column of "the first TCB number to which 'busy' is reported" at device number 0 in the table 42 (refer to FIG. 15). It is possible to enter a maximum of N TCB numbers for each device 3 in the table 42 shown in FIG. 4.

The re-connecting management table (queue: generation order storing unit) 44 is configured as shown in FIG. 6 to function as a generation order storing unit storing a generation order of re-connecting factors. The RM 12 according to this embodiment monitors generation of the first and second re-connecting factors described above, stores the generation order in the re-connecting management table 44, and controls the CA 11 to re-connect a channel interface with a CPU 2 relating to each re-connecting factor in the generation order stored in the re-connecting management table 44.

More concretely, the RM 12 determines that the first re-connecting factor generates when receiving a release command from a CPU 2, and enters a TCB number relating to that first re-connecting factor in the re-connecting management table 44. On the other hand, when a staging operation completion report has been received, the RM 12A determines that the second re-connecting factor generates, and enters a TCB number relating to that second re-connecting factor in the re-connecting management table 44. Whereby, the order in which the first and second re-connecting factors have generated is entered and stored with TCB numbers in the re-connecting management table 44 irrespective of a type of each re-connecting factor.

Next, detailed operations of the RM 12A and the TS 13A in the above FCU 1A according to this embodiment will be described with reference to FIGS. 7 through 22.

First, flows of the operations of the RM 12A and the TS 13A will be described with reference to flowcharts shown in FIGS. 7 through 11.

Figure 7:
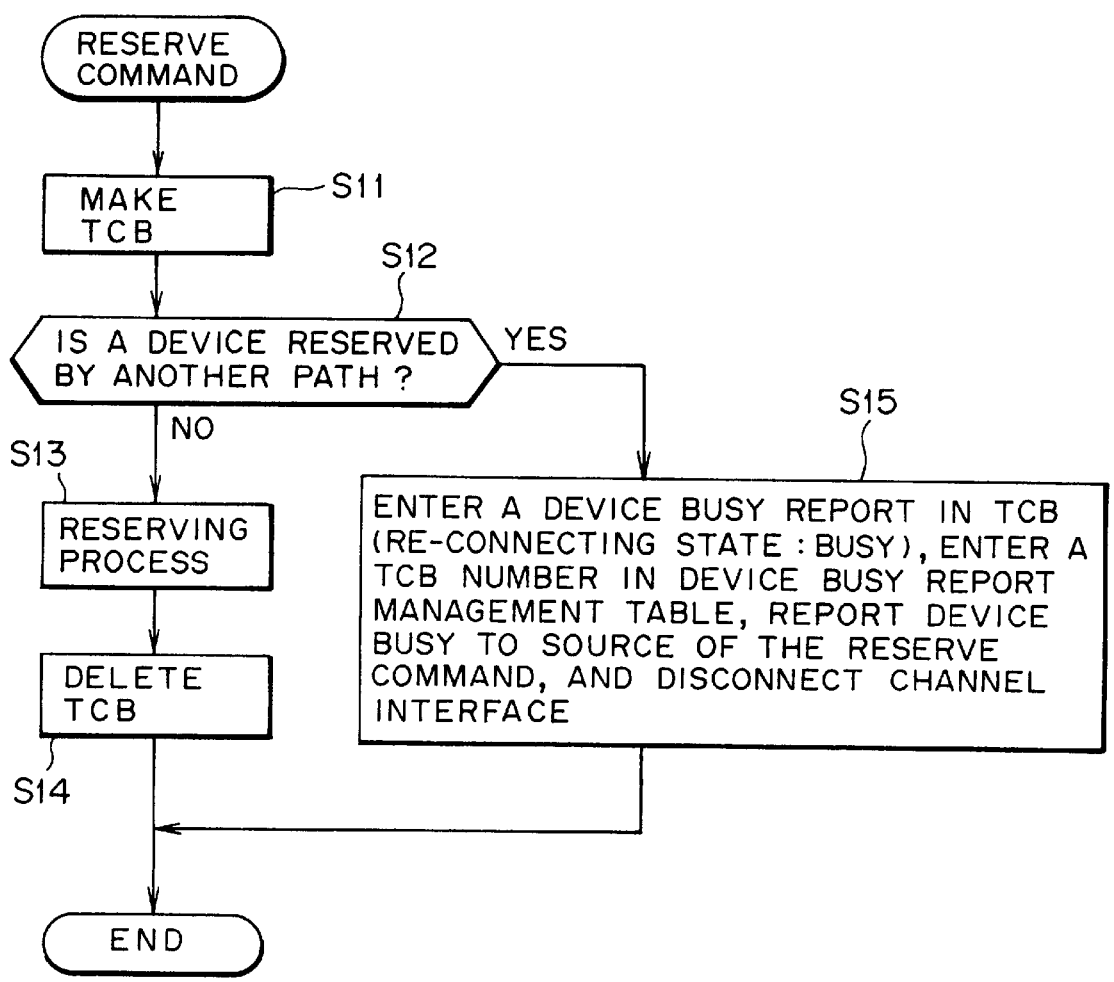
FIG. 7 is a flowchart illustrating an operation of the RM when the RM has received a reserve command according to the embodiment.

FIG. 7 is a flowchart illustrating an operation of the RM 12A when the RM 12A receives a reserve command. As shown in FIG. 7, the RM 12A makes a TCB 43 with respect to a reserve command when receiving the reserve command (Step S11), refers to the reserve management table 41, and determines whether or not a device 3 that is an object of the reserve command is reserved by another CPU 2 (another path, another channel) (Step S12).

When the device 3 is not reserved by another path (NO route at Step S12), the RM 12A performs a reserving process on the device 3 that is an object of the reserve command (Step S13), then deletes the TCB 43 with respect to the reserve command (Step S14). In the reserving process, the RM 12A sets "1" at the intersection of a device number of the device 3 that is an object of the reserve and a CA 11 having received the reserve command.

When the device 3 that is an object of the reserve command is reserved by another path (YES route at Step S12), the RM 12A enters "busy" in a column of re-connecting state of the TCB 43, enters a number (TCB number) of the TCB 43 made at Step S11 at a device number corresponding to the device 3 that is an object of the reserve command in the device busy report management table 42 in the order in which busy reports have been made, makes a device busy report to a CPU 2 that is a source of the reserve command, then controls the CA 11 so as to disconnect the channel interface with the CPU 2 (Step S15). On this occasion, the RM 12A does not delete the TCB 43 as in the past, but holds the TCB 43 until a device end report is made due to device release.

Figure 8:
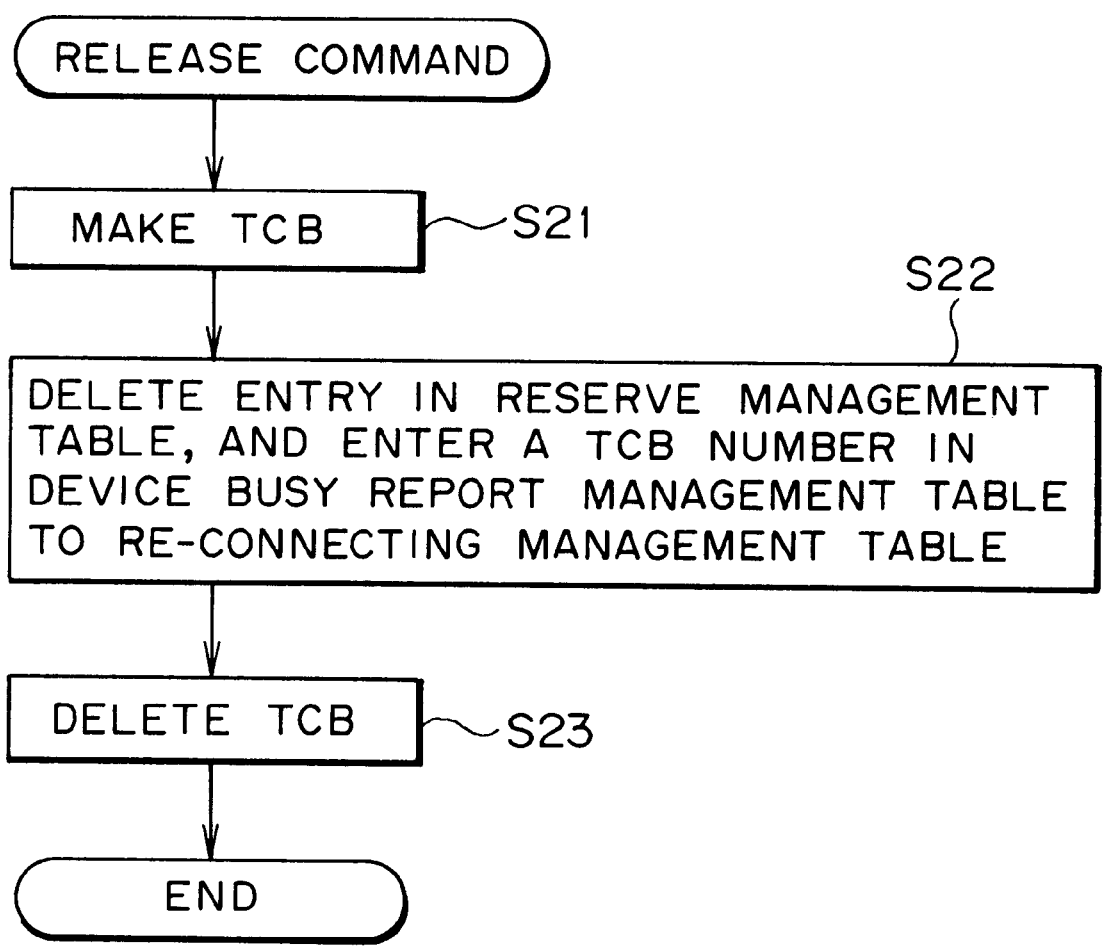
FIG. 8 is a flowchart illustrating an operation of the RM when the RM has received a release command according to the embodiment.

FIG. 8 is a flowchart illustrating an operation of the RM 12A when the RM 12A receives a release command. As shown in FIG. 8, the RM 12A makes a TCB 43 with respect to a release command when receiving the release command from a CPU 2 occupying a device 3 (Step S21), deletes a corresponding entry (setting of "1") in the reserve management table 31, and enters a TCB number of the device 3 whose occupancy will be released in the re-connecting management table 44 if the TCB number is entered in the device busy report management table 42 (Step S22). On this occasion, when a plurality of TCB numbers are entered, the TCB numbers are entered in the re-connecting management table 44 in the order in which the TCB numbers have been entered. After that, the RM 12A deletes the TCB 43 with respect to the release command (Step S23).

Figure 9:
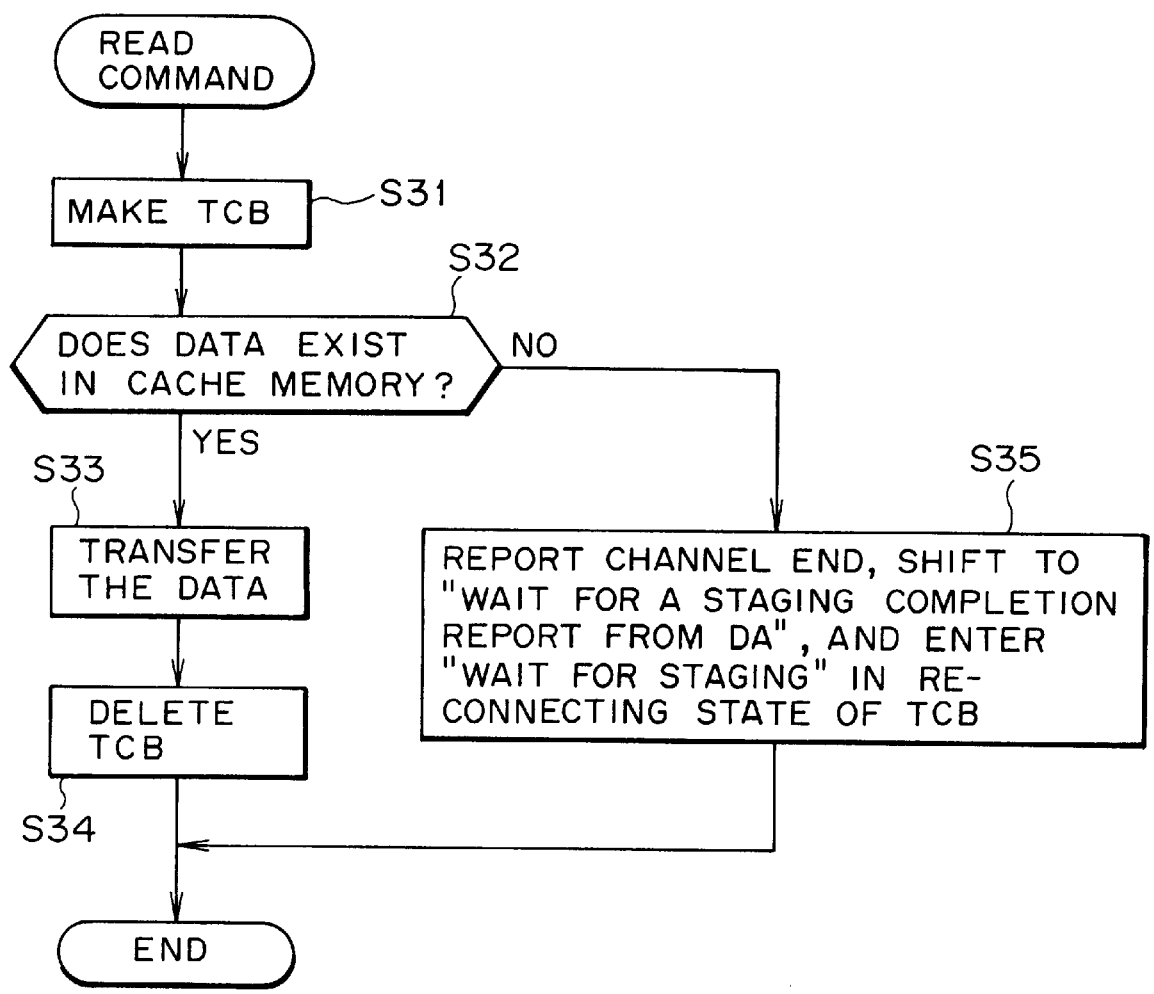
FIG. 9 is a flowchart illustrating an operation of the RM when the RM has received a read command according to the embodiment.

FIG. 9 is a flowchart illustrating an operation of the RM 12A when the RM 12A receives a read command. As shown in FIG. 9, when the RM 12A receives a read command from a CPU 2 occupying a device 3, the RM 12A makes a TCB 43 with respect to the read command (Step S31), and determines through the CFE 14 whether or not data to be read exists in the cache memory 15 (Step S32).

When the data to be read exists in the cache memory 15 (YES route at Step S32), the RM 12A transfers the data from a corresponding CA 11 to the CPU 2 (Step S33), then deletes the TCB 43 with respect to the read command (Step S34).

When the data to be read does not exist in the cache memory 15 (NO route at Step S32), the RM 12A reports channel end through the CA 11 to the CPU 2, requests the DA 16 to perform staging on the device 3, shifts to a staging completion report waiting process to be described with reference to FIG. 10, and enters "wait for staging" in a column of re-connecting state of the TCB 43 (Step S35). On this occasion, the TCB 43 with respect to the read command is not deleted, but kept held.

Figure 10:
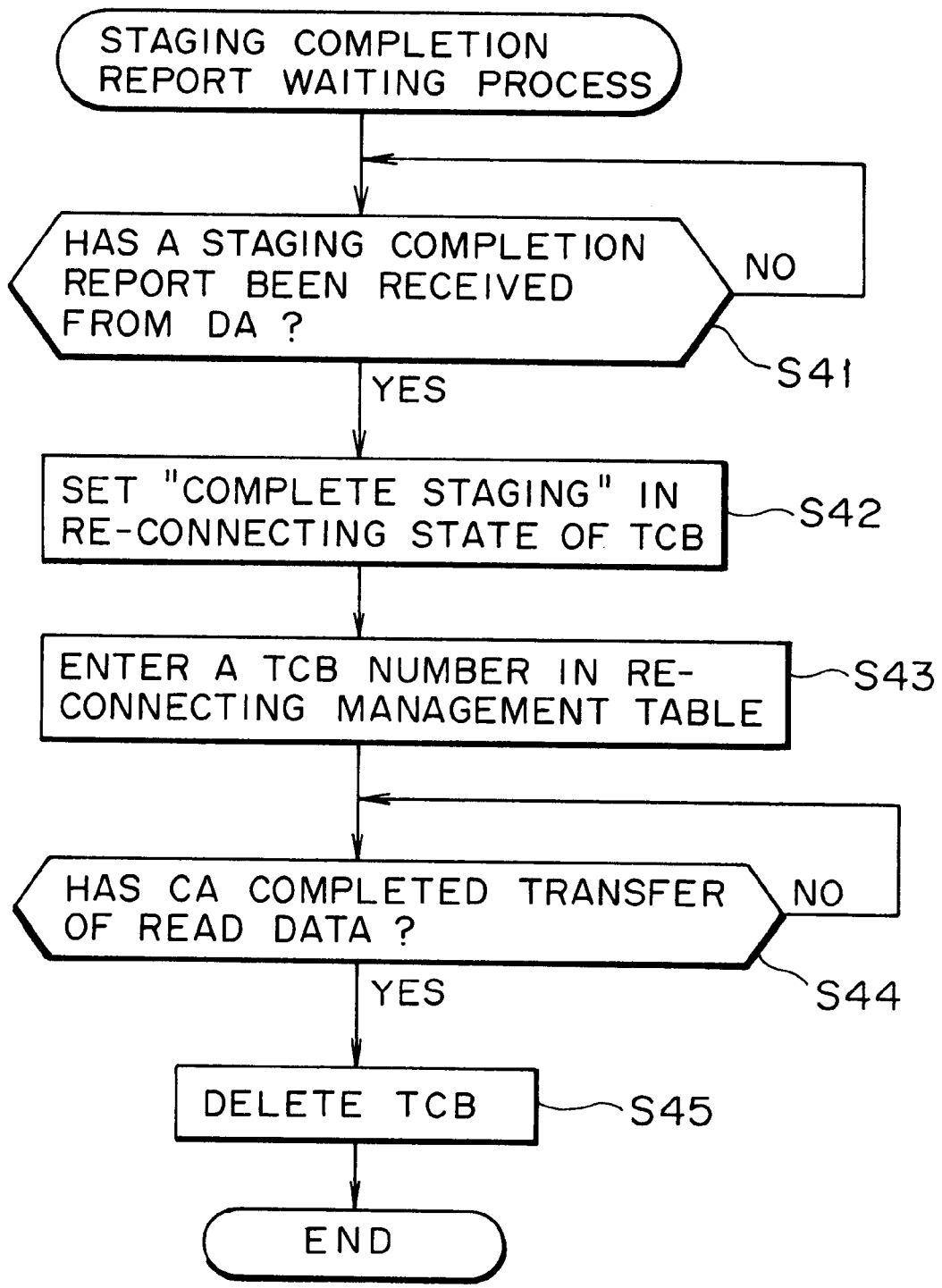
FIG. 10 is a flowchart illustrating a staging completion report waiting process by the RM according to the embodiment.

FIG. 10 is a flowchart illustrating a staging completion report waiting process by the RM 12A. As shown in FIG. 10, the RM 12A waits for a staging completion report from a DA 16 to which the RM 12A requests for staging (Step S41). When receiving a staging completion report from the DA 16 (YES route at Step S41), the RM 12A changes a setting of re-connecting state in the TCB 43 with respect to a corresponding read command from "wait for staging" to "complete staging" (Step S42).

The RM 12A enters a TCB number of a task whose re-connecting state has been set to "complete staging" at Step S42 in the re-connecting management table 44 (Step S43), and waits for data having been read in the staging operation to be transferred to a CPU 2 re-connected according to an idle loop to be described later with reference to FIG. 11 by a CA 11 (Step S44). When the CA 11 completes transfer of the data (YES route at Step S44), the RM 12A deletes the TCB 43 with respect to the read command that is in a state of "wait for a staging completion report" (step S45).

Figure 11:
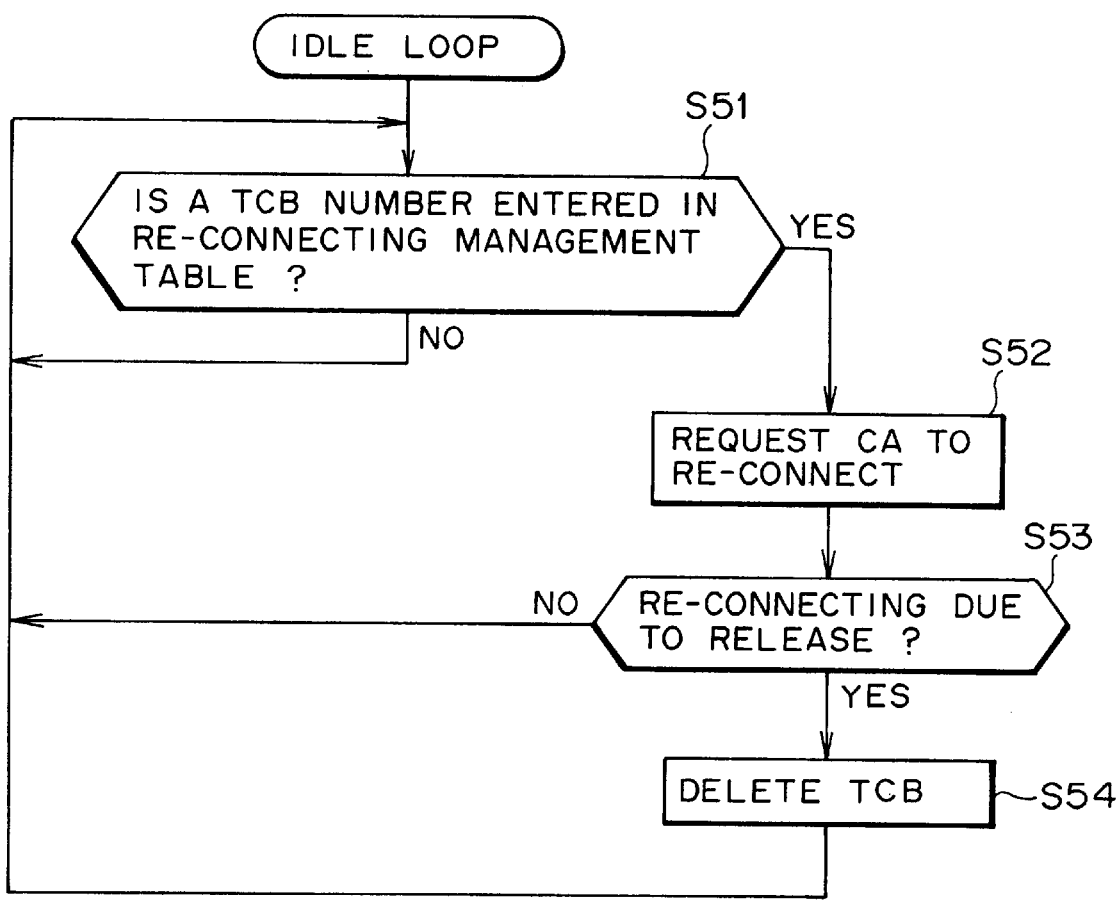
FIG. 11 is a flowchart illustrating a process by the RM using an idle loop according to the embodiment.

FIG. 11 is a flowchart illustrating a process performed by the RM12A using the idle loop. As shown in FIG. 11, the RM 12 always determines using the idle loop whether or not a TCB number is entered in the re-connecting management table 44, that is, whether or not the first or second re-connecting factor generates (Step S51).

When a TCB number is entered in the re-connecting management table 44 (YES route at Step S51), the RM 12A refers to a TCB 43 of that TCB number, re-connects a corresponding CPU 2, and requests a CA 11 to perform a process corresponding to a re-connecting state on the CPU 2 (Step S52). When the re-connecting state is "busy", the RM 12A makes the CA 11 report device end to the CPU 2. When the re-connecting state is staging completion, the RM 12A makes the CA 11 report "complete staging" to the CPU 2 and transfer read data.

The RM 12A then determines whether or not the re-connecting performed at Step S52 is due to device release (the first re-connecting factor) (Step S53). When the re-connecting is due to device release (YES route at Step S53), the RM 12A deletes a corresponding TCB (Step S54). When the re-connecting is not due to device release (in the case of re-connecting due to staging completion; NO route at Step S53), the RM 12A does nothing since the TCB 43 has been deleted at Step S45 in FIG. 10, but returns to Step S51.

Next, concrete contents entered in the tables 41, 42 and 44, and the TCB 43 will be described with reference to FIGS. 12 through 22.

When a reserve command for the device 3-0 is issued from the channel 2a of the CPU 2-0 in a state where nothing is entered in all the tables 41, 42 and 44, and the TCB 43, for example, "0" is entered as device number, "0" as CA number and "reserve" as command at a TCB number 1 in the TCB 43, as shown in FIG. 12. On this occasion, since any device 3 is not yet reserved, a reserving process is performed on the device 3-0, and "1" is set at the intersection of device number 0 and "CA0" in the reserve management table 41, as shown in FIG. 13. After that, the TCB 43 at TCB number 1 made as shown in FIG. 12 is deleted.

When a reserve command for the device 3-0 is issued through the channel 2a (CA 11-2) of the CPU 2-1 in a state where the CPU 2-0 occupies the device 3-0 through the channel 2a (CA 11-0), "0" is entered as device number, "2" as CA number and "reserve" as command at TCB number 1 in the TCB 43, as shown in FIG. 14. Since the device 3-0 has already been occupied by the CPU 2-0, "device busy" is reported to the CPU 2-1, a channel interface with the CPU 2-1 is disconnected, "busy" is set in a column of re-connecting state at TCB number 1 as shown in FIG. 14, and TCB number 1 is set in a column of "the first TCB number to which 'busy' is reported" at device number 0 in the device busy report management table 42 as shown in FIG. 15. On this occasion, the TCB 43 at TCB number 1 shown in FIG. 14 is not deleted, but kept held until device end is reported.

When the CPU 2-1 reads data from the device 3-1 thereafter, a reserve command for the device 3-1 is issued from the channel 2a of the CPU 2-1, and "1" is entered as device number, "3" as CA number and "reserve" as command at TCB number 2 in the TCB 43, as shown in FIG. 16. On this occasion, since the device 3-1 is not reserved, a reserving process is performed on the device 3-1, and "1" is set at the intersection of device number 1 and "CA 3" in the reserve management table 31, as shown in FIG. 17. After that, the TCB 43 at TCB number 2 made as shown in FIG. 16 is deleted.

When the CPU 2-1 having reserved the device 3-1 issues a read command as above, "1" is entered as device number, "3" as CA number and "read" as command at TCB number 2 in the TCB 43, as shown in FIG. 18. On this occasion, if data to be read does not exist in the cache memory 15, a staging operation is initiated on the device 3-1, and "wait for staging" is set in a column of re-connecting state at TCB number 2. The TCB 43 at TCB number 2 is not deleted but kept held until the staging operation is completed.

When the CPU 2-0 having reserved the device 3-0 issues a release command through the CA 11-0 in this state, "0" is entered as device number, "0" as CA number and "release" as command at TCB number 3 in the TCB 43, as shown in FIG. 19. Then, "1" set at the intersection of device number 0 and "CA0" is deleted in the reserve management table 41, as shown in FIG. 20, TCB number 1 is entered in a column corresponding to re-connecting order 1 in the re-connecting management table 44 as shown in FIG. 22, after that, the TCB 43 at TCB number 3 made as shown in FIG. 19 is deleted.

When the staging operation is completed following release of the device 3-0, "complete staging" is set in a column of re-connecting state at TCB number 2 in the TCB 43, as shown in FIG. 21, and TCB number 2 is entered in a column corresponding to re-connecting order 2 in the re-connecting management table 44, as shown in FIG. 22.

The RM 12A monitors the re-connecting management table 44 using the idle loop described above with reference to FIG. 11. When the RM 12A recognizes that TCB number 1 and TCB number 2 are entered in the re-connecting management table 44 as shown in FIG. 22, the RM 12A requests the CA 11 to perform a re-connecting process in the order in which the TCB numbers have been entered. Namely, the RM 12A refers to a TCB 43 at TCB number 1, requests the CA 11-2 for a device end report about the device 3-0, then deletes that TCB 43. The RM 12A next refers to a TCB 43 at TCB number requests the CA 11-3 for a staging completion report, and deletes that TCB 43.

According to this embodiment of this invention, a table for managing staging completion reports and a table for managing device end reports are integrated into one re-connecting management table 44, and the re-connecting management table 44 is retrieved using the idle loop shown in FIG. 11, whereby the RM 12A requests CAs 11 to perform re-connecting in the order in which re-connecting factors have generated. In other words, it is possible to perform a re-connecting process in the order in which re-connecting factors have generated irrespective of a type of each re-connecting factor. For this, it is possible to avoid a bias in performing the re-connecting process, and make both a device end report due to release and a staging completion report without delay and postponement.

It is therefore possible to make device end reports in the order in which devices have been released, and certainly avoid postponement of device end reports that has occurred due to an increase of the number of staging completion reports.

According to this embodiment, TCB numbers are entered in the device busy management table 42 in the order in which device busy reports have been made, whereby the device end reports are made in the order in which the device busy reports have been made so that delay of a device end report is avoided.

Further, according to this embodiment, a state where a device busy report has been made and a state where completion of a staging operation is waited are managed using the TCB 43, whereby the order in which re-connecting processes should be performed is managed using TCB numbers so that the re-connecting process is largely simplified.

As having been described the present invention, the present invention is not limited to the above example, but may be modified in various ways without departing from a scope of this invention.

For example, the above embodiment has been described by way of example where two CPUs 2 and three devices 3 are provided as processing apparatus and storing apparatus, respectively. However, the present invention is not limited to the above example.

Further, the re-connecting factors are in two types, device release and staging completion, in the above embodiment. However, the present invention is not limited to the above example, but applicable to a case where the re-connecting factors are in three or more types, or the re-connecting factors include a re-connecting factor in another type. In either case, it is possible to attain the same functions and effects as the above embodiment.

What is claimed is:

1. In a system having a file controlling apparatus provided between a plurality of processing apparatuses and a plurality of file storing apparatuses to control an accessing operation on each of said file storing apparatuses in response to a command from each of said processing apparatuses in order that said plurality of processing apparatuses share said plurality of file storing apparatuses, a method for controlling re-connection of a channel interface between one of said plurality of processing apparatuses and said file controlling apparatus due to generation of a re-connecting factor, after said channel interface therebetween has been temporarily made to be in a disconnected state since the processing apparatus cannot immediately access to one of said plurality of file storing apparatuses when the processing apparatus accesses to the file storing apparatus, said channel interface re-connecting controlling method comprising:

monitoring generation of said re-connecting factors;

storing the order of generation of said re-connecting factors; and re-connecting said channel interface between the processing apparatus relating to each of said re-connecting factors and the file controlling apparatus relating to each of said re-connecting factors in the stored order of generation of said re-connecting factors;

wherein said re-connecting factors comprise:

a first re-connecting factor generated when the file storing apparatus is released from another processing apparatus, after said file controlling apparatus makes a busy report to the former processing apparatus and a channel interface between the former processing apparatus and said file controlling apparatus has been temporarily made to be in a disconnected state, since the file storing apparatus is occupied by the latter processing apparatus when the former processing apparatus accesses to the file storing apparatus; and a second re-connecting factor generated when said file controlling apparatus completes a staging operation, which staging operation reads data from said file storing apparatus into a cache memory when the data to be accessed does not exist in the cache memory in said file controlling apparatus, after a channel interface between the processing apparatus and said file controlling apparatus has been temporarily made to be in a disconnected state since said file controlling apparatus shifts to said staging operation on a file storing apparatus in response to a command from a certain processing apparatus.

2. A file controlling apparatus provided between a plurality of processing apparatuses and a plurality of file storing apparatuses in order that said plurality of processing apparatuses share said plurality of file storing apparatuses to control an accessing operation on each of said file storing apparatuses in response to a command from each of said processing apparatuses, said file controlling apparatus comprising:

a controlling unit for controlling re-connection of a channel interface between one of said plurality of processing apparatuses and said file controlling apparatus due to generation of a re-connecting factor, after said channel interface between the processing apparatus and said file controlling apparatus has been temporarily made to be in a disconnected state since the processing apparatus cannot immediately access to one of said plurality of file storing apparatuses when the processing apparatus accesses to the file storing apparatus; and a generation order storing unit for storing the order of generation of said re-connecting factors;

wherein said controlling unit monitors generation of said re-connecting factors, stores the order of generation of said re-connecting factors in said generation order storing unit, and re-connects said channel interface between the processing apparatus relating to each of said re-connecting factors and the file controlling apparatus relating to each of said re-connecting factors in the order of generation stored in said generation order storing unit; and said re-connecting factors comprises:

a first re-connecting factor generated when the file storing apparatus is released from another processing apparatus, after said file controlling apparatus makes a busy report to the former processing apparatus and a channel interface between the former processing apparatus and said file controlling apparatus has been temporarily made to be in a disconnected state, since the file storing apparatus accessed by the former processing apparatus is occupied by the latter processing apparatus; and a second re-connecting factor generated when said file controlling apparatus completes a staging operation, which staging operation reads data from said file storing apparatus into a cache memory when the data to be accessed does not exist in the cache memory in said file controlling apparatus, after a channel interface between the processing apparatus and said file controlling apparatus has been temporarily made to be in a disconnected state since said file controlling apparatus shifts to said staging operation on a file storing apparatus in response to a command from a certain processing apparatus.

3. The file controlling apparatus according to claim 2, wherein said controlling unit determines that said first re-connecting factor generates when a release command has been received from the latter processing apparatus, and enters said first re-connecting factor in said generation order storing unit.

4. The file controlling apparatus according to claim 3, wherein said controlling unit manages said busy report using a task control block, and enters a number of said task control block in said generation order storing unit when said first re-connecting factor generates.

5. The file controlling apparatus according to claim 3 further comprising a busy report order storing unit for storing the order in which said busy reports have been made.

6. The file controlling apparatus according to claim 2, wherein said controlling unit determines that said second re-connecting factor generates when a completion report about said staging operation has been received, and enters said second re-connecting factor in said generation order storing unit.

7. The file controlling apparatus according to claim 6, wherein said controlling unit manages a state of waiting for said completion report about said staging operation using a task control block, and enters a number of said task control block in said generation order storing unit when said second re-connecting factor generates.

* * * * *